US007731586B2

(12) United States Patent
Letovsky et al.

(10) Patent No.: US 7,731,586 B2
(45) Date of Patent: Jun. 8, 2010

(54) METHOD AND SYSTEM FOR REMOTE GAMING

(75) Inventors: Howard Letovsky, Willits, CA (US); Tony Fontaine, Henderson, NV (US)

(73) Assignee: Station Casinos, Las Vegas, NV (US)

( * ) Notice: Subject to any disclaimer, the term of this patent is extended or adjusted under 35 U.S.C. 154(b) by 165 days.

(21) Appl. No.: 12/077,440

(22) Filed: Mar. 18, 2008

(65) Prior Publication Data

US 2008/0176637 A1 Jul. 24, 2008

Related U.S. Application Data

(60) Division of application No. 09/985,175, filed on Apr. 8, 2002, now abandoned, which is a continuation-in-part of application No. 09/833,448, filed on Apr. 12, 2001, now abandoned.

(60) Provisional application No. 60/244,832, filed on Nov. 1, 2000.

(51) Int. Cl.
*A63F 13/00* (2006.01)

(52) U.S. Cl. ............................ 463/20; 463/42; 463/12; 463/13

(58) Field of Classification Search ....................... None
See application file for complete search history.

(56) References Cited

U.S. PATENT DOCUMENTS

| | | | | |
|---|---|---|---|---|
| 4,339,798 | A | 7/1982 | Hedges et al. | 463/26 |
| 4,357,015 | A | 11/1982 | Santora et al. | 463/22 |
| 4,467,424 | A | 8/1984 | Hedges et al. | 463/26 |
| 4,511,886 | A | 4/1985 | Rodriguez | 340/534 |
| 4,531,187 | A | 7/1985 | Uhland | 463/12 |
| 4,652,998 | A | 3/1987 | Koza et al. | 364/412 |
| 4,745,468 | A | 5/1988 | Von Kohorn | 725/141 |
| 4,792,993 | A | 12/1988 | Ma | |
| 5,114,155 | A | 5/1992 | Tillery et al. | 273/371 |
| 5,333,868 | A | 8/1994 | Goldfarb | |

(Continued)

FOREIGN PATENT DOCUMENTS

| | | |
|---|---|---|
| US | 01/42890 | 11/2001 |

OTHER PUBLICATIONS

U.S. Appl. No. 60/244,832, Filed Nov. 1, 2000, Fontaine et al.

(Continued)

*Primary Examiner*—Ronald Laneau
*Assistant Examiner*—Tramar Harper
(74) *Attorney, Agent, or Firm*—Milbank, Tweed, Hadley & McCloy LLP

(57) ABSTRACT

Aspects of the present invention relate to systems and methods by which a player may remotely participate in casino gaming activity. Such aspects may include a video camera configured to provide visual data concerning the casino gaming activity to the player, a microphone configured to provide audio data concerning the casino gaming activity to the player, and a data network coupled with the video camera and the microphone. In such aspects, the player may be located in a hotel guest room, the hotel guest room may include a video display coupled with the data network, and one or more buttons of a remote control device associated with said video display may be configured to control said player's remote participation in the casino gaming activity.

44 Claims, 11 Drawing Sheets

U.S. PATENT DOCUMENTS

| | | | | |
|---|---|---|---|---|
| 5,351,970 | A | 10/1994 | Fioretti | |
| 5,374,061 | A | 12/1994 | Albrecht | 273/149 R |
| 5,585,858 | A | 12/1996 | Harper et al. | 348/485 |
| 5,586,937 | A | 12/1996 | Menashe | |
| 5,654,746 | A | 8/1997 | McMullan, Jr. et al. | |
| 5,654,750 | A | 8/1997 | Weil et al. | 348/143 |
| 5,762,552 | A | 6/1998 | Vuong et al. | 463/25 |
| 5,770,533 | A | 6/1998 | Franchi | 463/42 |
| 5,775,993 | A | 7/1998 | Fentz et al. | 463/17 |
| 5,781,532 | A | 7/1998 | Watt | |
| 5,800,268 | A | 9/1998 | Molnick | |
| 5,830,067 | A | 11/1998 | Graves et al. | |
| 5,851,149 | A | 12/1998 | Xidos et al. | 463/42 |
| 5,954,582 | A | 9/1999 | Zach | |
| 5,991,801 | A | 11/1999 | Rebec et al. | 709/219 |
| 6,001,016 | A | 12/1999 | Walker et al. | |
| 6,024,641 | A | 2/2000 | Sarno | |
| 6,080,063 | A | 6/2000 | Khosla | |
| 6,089,982 | A | 7/2000 | Holch et al. | 463/42 |
| 6,104,815 | A | 8/2000 | Alcorn et al. | 380/251 |
| 6,117,011 | A | 9/2000 | Lvov | |
| 6,165,069 | A | 12/2000 | Sines et al. | 463/12 |
| 6,183,366 | B1 | 2/2001 | Goldberg et al. | 463/42 |
| 6,254,480 | B1 | 7/2001 | Zach | |
| 6,256,669 | B1 | 7/2001 | Hurwitz | |
| 6,292,834 | B1 | 9/2001 | Ravi et al. | |
| 6,306,038 | B1 | 10/2001 | Graves et al. | |
| 6,361,437 | B1 * | 3/2002 | Walker et al. | 463/23 |
| 6,452,612 | B1 | 9/2002 | Holtz et al. | 345/723 |
| 6,475,086 | B2 | 11/2002 | Zach | |
| 6,508,709 | B1 | 1/2003 | Karmarkar | |
| 6,527,638 | B1 | 3/2003 | Walker et al. | |
| 6,529,146 | B1 | 3/2003 | Kowalski et al. | 341/50 |
| 6,575,834 | B1 | 6/2003 | Lindo | 463/40 |
| 6,582,301 | B2 | 6/2003 | Hill | 463/11 |
| 6,587,875 | B1 | 7/2003 | Ogus | |
| 6,601,009 | B2 | 7/2003 | Florschuetz | |
| 6,731,600 | B1 | 5/2004 | Patel et al. | |
| 6,745,086 | B1 | 6/2004 | Pasadyn et al. | |
| 6,755,741 | B1 * | 6/2004 | Rafaeli | 463/25 |
| 7,470,196 | B1 * | 12/2008 | Joshi | 463/42 |
| 2002/0094869 | A1 | 7/2002 | Harkham | 463/42 |

OTHER PUBLICATIONS

May 5, 2008 Final Rejection for U.S. Appl. No. 09/833,448.
Sep. 4, 2007 Notice of nonresponsive amendment for U.S. Appl. No. 09/833,448.
Aug. 20, 2007 Response to Nonfinal for U.S. Appl. No. 09/833,448.
Feb. 2, 2007 Nonfinal Rejection for U.S. Appl. No. 09/833,448.
Sep. 22, 2006 Appeal Brief for U.S. Appl. No. 09/833,448.
Aug. 4, 2006 Appeal Brief for U.S. Appl. No. 09/833,448.
Jan. 25, 2006 Notice of Appeal for U.S. Appl. No. 09/833,448.
Jul. 28, 2005 Final Rejection forU.S. Appl. No. 09/833,448.
Feb. 3, 2005 Response to Nonfinal for U.S. Appl. No. 09/833,448.
Aug. 3, 2004 Nonfinal Rejection for U.S. Appl. No. 09/833,448.
Feb. 27, 2003 Response to Nonfinal for U.S. Appl. No. 09/833,448.
Aug. 29, 2003 Nonfinal Rejection for U.S. Appl. No. 09/833,448.
http://www.arcelect.com/bell.htm - Arc Electronics Primer on Premises Data Communications, Aug. 27, 2001.
http://www.arcelect.com/vspecifi.htm - Arc Electronics Old Bell Modem Standards, Aug. 27, 2001.
Dec. 11, 2002 Restriction Requirement for U.S. Appl. No. 09/833,448.
Jun. 2, 2003 Response to Restriction for U.S. Appl. No. 09/833,448.
Mar. 6, 2006 Pre-Brief Appeal Conference Decision for U.S. Appl. No. 09/833,448.
Dec. 26, 2007 Response to Nonfinal for U.S. Appl. No. 09/833,448.
Dec. 29, 2008 Abandonment for U.S. Appl. No. 09/833,448.
Mar. 15, 2004 Nonfinal Rejection for U.S. Appl. No. 09/985,175.
Sep. 15, 2004 Response to Nonfinal for U.S. Appl. No. 09/985,175.
Dec. 30, 2004 Final Rejection for U.S. Appl. No. 09/985,175.
Jun. 30, 2005 Response to Final for U.S. Appl. No. 09/985,175.
Aug. 9, 2006 Nonfinal Rejection for U.S. Appl. No. 09/985,175.
Jan. 8, 2007 Response to Nonfinal for U.S. Appl. No. 09/985,175.
Apr. 9, 2007 Final Rejection for U.S. Appl. No. 09/985,175.
Oct. 9, 2007 Response to Final for U.S. Appl. No. 09/985,175.
Apr. 25, 2008 Amendment for U.S. Appl. No. 09/985,175.
Oct. 2, 2008 Abandonment for U.S. Appl. No. 09/985,175.

* cited by examiner

METHOD AND SYSTEM FOR REMOTE GAMING

RELATION TO OTHER APPLICATIONS

This application is a divisional of Application Ser. No. 09/985,175, filed Apr. 8, 2002 now abandoned, which is a continuation-in-part of U.S. patent application Ser. No. 09/833,448, filed Apr. 12, 2001 now abandoned, which claims priority to U.S. Patent Application Ser. No. 60/244,832, filed Nov. 1, 2000.

FIELD OF THE INVENTION

The present invention relates to a method of and apparatus for gambling. More particularly, the invention relates to network gaming systems that allow players to place wagers through any one of a variety of communications links.

BACKGROUND OF THE INVENTION

In jurisdictions where casino gambling and slot machines are legal, slot machines account for the majority of gaming revenues. In a casino, it is common to see 70% or more of the gaming floor space dedicated to slot machines, both of the reel spinning and video varieties. Typically these machines make their return on investment based on two to four hours of play per day. They offer an experience tailored to individual play. The popularity of these machines is related to the variety of the games offered, the simplicity of the rules, and the attraction of the themes. In addition to the experience offered by the game, the player is assured that the game offers a reasonable chance of winning. This assurance is due to the game being subject to a variety of governmental and regulatory oversight. Wagering devices are highly regulated, and each machine must pass governmentally dictated requirements or it will not be approved for use. Although these regulatory requirements often vary from one gaming jurisdiction to another, the player is assured of a fair game of chance as dictated by that jurisdiction's governing regulatory body, regardless of the jurisdiction in which the machine and the player are located.

Remote-based gaming offers gaming operators the opportunity to offer gaming to remote locations and, correspondingly, provide remote users with access to gaming. The increasing popularity and number of Internet-based casinos confirms this proposition. Remote-based gaming to date has been based either on live events such as horse racing and sports wagering, or virtual games replicating the games played in traditional casino games. See, e.g., U.S. Pat. Nos. 5,800,268, to Molnick, 5,762,552, to Vuong et al., and 4,467,424, to Hedges et al., which are incorporated by reference in their entirety. Virtual games offer an operator the distinct advantage of allowing an unlimited number of users to access one software-based game. A single computer server can host a suite of games that may be accessed by a theoretically unlimited number of players. See, e.g., U.S. Pat. Nos. 5,586,937, to Menahse, 6,080,063, to Khosla, and 6,117,011, to Lvov, which are incorporated by reference in their entirety. The use of virtual games for wagering has three major disadvantages for the operator and the player: high software development costs, the time and costs associated with the regulatory approval process, and lack of consumer confidence in the honesty of the game. The present invention alleviates these disadvantages while providing a higher return on investment than found in a traditional casino.

SUMMARY OF THE INVENTION

The present invention provides a unique and novel means to allow a wagering device to be observed, controlled, and played from a remote location. With the invention, existing, previously approved wagering devices may be used. This effectively nullifies the need for ongoing software game development. It also creates a new secondary market for used wagering devices. The approval cycle for implementing the remote play version is shortened considerably because the wagering devices have already undergone the regulatory approval cycle before being customized for remote play. Correspondingly, the costs of regulatory approval are reduced significantly.

The present invention also provides the consumer with increased confidence in the games offered. Given this increased consumer confidence and the nature of the Internet, the amount of time played on each wagering device will increase correspondingly. Instead of two to four hours of play per day, a device may be played twenty-four hours a day on the Internet. The revenue generated by a wagering device employed in the invention can generate six to twelve times the revenue per day as the same wagering device found on a casino floor.

In a preferred embodiment of the present invention, the user may access the gaming system via the Internet. In cases where legal restrictions on Internet gaming prohibit such access, an appropriate communications medium, such as a private or virtual private network may be used. In one preferred embodiment, the gaming system will provide a visual display and selection of available wagering devices, and a video presentation of the wagering device selected. This display may either be a virtual rendition of the wagering devices or the wagering devices themselves. The wagering devices as referenced herein may be traditional standalone gaming devices such as reel spinning slot machines, video based slot machines, video lottery terminals (VLTs), or any other suitable electrical and/or mechanical gaming device, such as single user video game machines for playing blackjack, poker, craps, baccarat, keno, roulette, and the like. Typically, these devices provide for standalone play; however, they may be networked together to provide for progressive jackpots.

The remote player interface is an element of the present invention that uses a client-based graphical user interface (GUI), or web page, to graphically and functionally replicate the input controls of the wagering device as a graphical remote control panel on a remote player's computer. In one preferred embodiment, instead of pressing the button on the wagering device to activate a command such as bet, spin, or any other available command, the remote player interface will receive the corresponding input from the player's remote control panel and activate the associated command. The remote player interface may also be used to debit and credit money into a player's account based upon input from the remote control panel. Video cameras may be positioned to capture all of the features of the game play. In the case of any dispute, all game play records are captured on the wagering device with date and time stamps that may be compared to archived video recordings of the game play.

Due to the large amount of data associated with the video output, a remote player will ideally have a high-bandwidth connection to the gaming system in a preferred embodiment. However, in order to accommodate lower data transmission speeds, the present invention may incorporate elements that enable automatic bandwidth detection and optimization of a user's data transmission speed. The gaming system may sense the bandwidth of a remote player's connection and automatically optimize the video output presentation in accordance the capabilities of the remote player's system. The invention may include various methods of encrypting, buffering, and displaying to enable such optimization. These methods may include activating compression codecs to control the frame rate for a given frame size for a given resolution. The compression codecs may minimize the frame bit size with the file then streamed to the remote player. Preferably, a combination of compression codecs in conjunction with hardware compression and file packaging/delay will assure that each remote user may get a full-motion video experience. It is understood that the methods for transmitting data described herein are merely illustrative; any suitable transmission methods and apparatus may be implemented.

Although intended for wagering purposes, in an alternative embodiment, the invention may be used for "play for fun" contests where no actual wagering is involved. Depending upon local regulations, an admission fee may or may not be collected. The award of prizes may also be subject to prevailing contest regulations.

In still another embodiment, a proxy, on behalf of remote users, may perform the remote player capabilities of the invention. This proxy may be human or mechanical, and may represent one or more players by physically performing inputs to the wagering device.

An interactive gaming system for enabling at least one remotely located player to place wagers on at least one remotely located wagering device of chance and providing the remotely located player with the ability to view game play and outcome from the remotely located wagering device in real time is disclosed. The system includes a communications network infrastructure having audio, video and data communications to and from a remote location, IP routing capability to various servers, associated peripherals required for storage and security, wagering devices, video cameras, software providing access to a player account to determine information and account status, debiting and crediting the account, and transference of funds between accounts, and archival capabilities for game play having audio and video records with date and time stamps.

Another disclosed system provides at least one controller coupled to at least one wagering device wherein the controller may accept input from a remote location and trigger the proper functions associated with the corresponding input on the wagering device, software configured to manage the controller, an associated graphical user interface defining a remote player console that is resident on a remote computer replicating the game play inputs located on a physical wagering device, software designed to accept input to the remote player console, and software facilitating communications to and from the physical wagering device.

Another system provides a video server that includes hardware and software capable of real-time or near real-time audio and video capture of the game play and outcome of a wagering device; hardware and software capable of real-time or near real-time transmission of the captured audio and video of the game play and outcome of a wagering device; hardware and software capable of the optimization of file size based upon input from the automatic bandwidth detection and optimization system; and hardware and software capable of transmission of the optimized file to at least one gaming server.

Still another system discloses wagering device nodes wherein the nodes include the association and coordination of at least one wagering device with at least one video camera, and the real-time or near real-time audio and video transmission of game play and the outcome of the wagering device to a server and a player's computer simultaneously.

Another disclosed system provides at least one wagering device server wherein the server may be configured with hardware and software to poll at least one wagering device for play availability, to provide a graphical user interface to a remote player that displays the availability of the wagering device based upon the polling function, to provide a remote player the ability to select an available wagering device via the graphical user interface, to route at least one remote player to a selected available node for game play, to activate the corresponding remote player interface, to provide a display of the remote player console corresponding to the selected wagering device to a remote player via the graphical user interface, to provide data communication between the remote player console and the gaming nodes, and to provide data communication between the player accounting system, the remote player console, and the remote player interface.

Another system provides a player accounting system configured to capture a remote player's and/or a remote player's affiliate game play time, to interface with a player tracking and accounting system, to interface with the remote player interface for transactions between the player tracking and accounting system and a remote player, to provide a remote player graphical user interface presenting account status and wagering icons, to provide an interstitial account server which may act as the wagering device bank in which the funds are kept to debit and/or credit the results of game play to a player account, to provide transferring of funds to/from a remote player's account from/to a physical wagering device, and to provide a remote player graphical user interface representation of the transference of funds to/from a remote player's account from/to a physical wagering device.

Another system in accordance with the invention includes a method and practice for wagering device operations wherein wagering devices may be aggregated in one common area, or "slot farm," for the purpose of accepting wagers from a person or persons remotely located from the slot farm via a Local Area, Wide Area, Private, Intra and/or Internet Network and may be operated by an on-line casino or time-share operator and may be controlled by a routing/traffic management server. The slot farm may consist of the gaming system and one or more wagering devices where the on-line casino operator may procure, implement, and manage the gaming system. In another embodiment, time-share operators may offer slot farm services for a fee. In yet another system, the system is managed for profit by leasing time of at least one wagering device to a third-party with or without consideration, sharing of revenue generated on a device by a third-party customer, and marketing and conducting of contests and/or tournaments, with or without consideration.

In another aspect of the invention, a system for remotely controlling at least one wagering device using a user computer contains a computer-readable memory for storing data for access by an application program and includes a data structure stored in the computer-readable memory. The data structure may include information used by the application program and may contain a plurality of personal data fields, financial fields, wagering device control fields, wagering fields, and results fields. The application program may use the field values to control the operation of the at least one wagering device. In various aspects, a plurality of fields, such as video display fields, account balance fields, archival fields, date fields, time fields, bandwidth fields, and transmission speed fields, may be employed in varying manners and combinations to permit control of a wagering device from a remote location.

In a further aspect of the invention, a system for remote wagering may include a video display, a control mechanism, smart card, network traffic manager, network, video/audio switcher modulator, a camera, and a gaming table device. The system may consist of a camera pointed at the gaming table or device, a microphone/amplifier combination, a video/audio distribution amplifier, a video graphic overlay board on the output of the camera that sends the same visual data to all players "seated" at their table in various remote locations, an account data/control signal conversion/table routing server, a SQL or other suitable database server, and a network traffic manager.

In another embodiment of the system described above, a video graphic overlay board may be connected to each output of the video/audio distribution amplifier. This embodiment allows different video data to be sent to each player "seated" in a particular remote location.

In a alternate embodiment of the system described above, a camera pointed at a gaming table or device, a microphone/amplifier combination, a game seat server, and a video/audio distribution amplifier may be arranged in combination. In this embodiment, the same visual data is sent to all players "seated" in various remote location.

In still another embodiment of the system described above, a plurality of game seat servers may be linked. In this embodiment, each player may be shown, for example, a "down card" or an account balance, without showing this information to other players in other remote locations.

In a further embodiment of the system described above, a video server may be used to store, create, and distribute multiple video streams. In this embodiment, compressed video may be stored then decoded before transmission remotely located players. This embodiment may also provide additional control options to the remotely located player.

The invention as described herein has several advantages over prior art solutions. A more complete understanding of the present invention, as well as further features and advantages will be obtained by reference to the following drawings, detailed description, and claims.

DETAILED DESCRIPTION OF THE INVENTION

Figure 1:
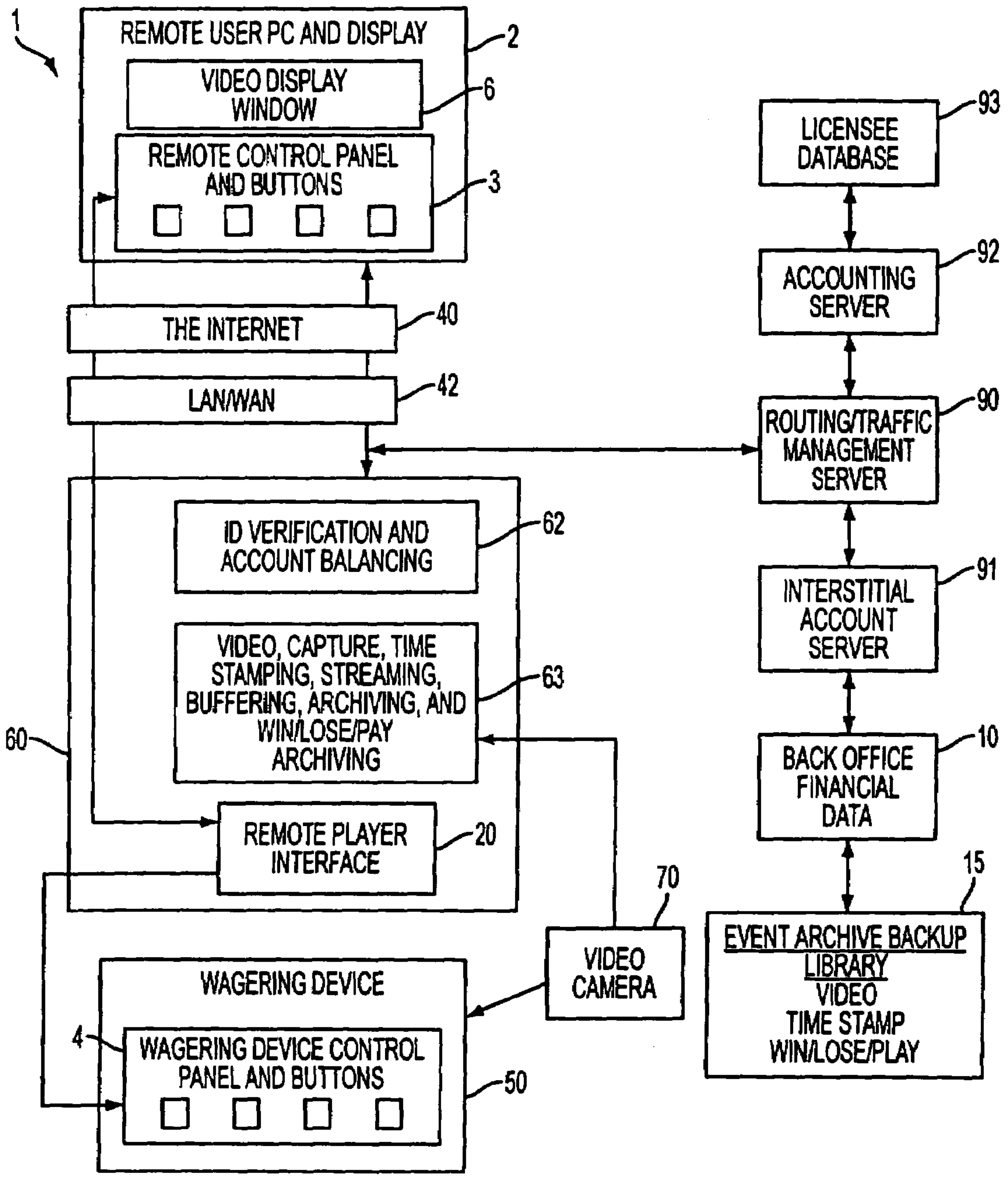
FIG. 1 is a schematic block diagram illustrating an exemplary method for providing a visual display and selection of wagering devices, and a video presentation of the wagering device selected, to remote players via the Internet, or over private or virtual private networks, according to the principles of the invention.

In a preferred embodiment, as shown in FIG. 1, a remote gaming apparatus 1 may include a remote user computer 2 with a visual display 6 and a remote control panel 3. User computer 2 may be an ALPHA server, a minicomputer, a microcomputer, a UNIX machine, a mainframe computer, a personal computer with an Intel Pentium processor, a Macintosh personal computer, a laptop, a personal data assistant (PDA), a pen computer, a kiosk or any other suitable computer. Of course, it is understood that a plurality of user computers may be employed in accordance with the principles of the invention. The graphically represented remote control panel 3 may be equipped with buttons or any other suitable manipulatable members. Use of user computers 2 to control wagering devices may be accomplished via a Web-style environment of point-and-click that directly links a user to desired sections. It is understood that selecting, pointing, clicking, choosing, and the like refer to the use of buttons, a mouse and mouse pointer, a stylus, a keyboard, a touch screen interface, or any other device for selecting according to the principles of the invention. In this embodiment, there may also be one or more wagering devices 50 fitted with a wagering device control panel 4. The wagering device control panel 4 is preferably equipped with remotely controllable buttons or any other suitable selecting member(s). Wagering device 50 of the invention may include any number of electrical and/or mechanical devices, including reel type and video slot machines, video lottery terminals, video keno terminals, single user video game machines, which may include black jack, poker, craps, baccarat, keno, roulette, and any other game that may be electrically and/or mechanically observed and remotely controlled. In addition, there may be one or more of a plurality of video cameras 70 that presents the selected wagering device 50 to remote players via a gaming server 60. A direct video connection may also be employed, alone or in combination with one or more video cameras 70, that presents the selected wagering device 50 to remote players. Server 60 may be an ALPHA server, a minicomputer, a microcomputer, a UNIX machine, a mainframe computer, a personal computer with an Intel Pentium processor, a Macintosh personal computer, or any other suitable computer. Server 60 may also be configured as a series of gaming servers managed by a routing/traffic management server 90, or accessed independently through network addresses. As depicted in FIG. 1, a video signal generated by a particular video camera 70 may also be transmitted through a network 40 and additional local or wide area networks 42 to a back office financial data server 10, an event archive backup library server 15, an interstitial account server 91, or other desired ancillary account servers 92. In a preferred embodiment, server 60 is a World Wide Web server connected to the Internet. The network is preferably the Internet, however, any network or connection, such as a telephone link, a hard-wired connection, a satellite link or other wireless connection, a local area network (LAN), a wide area network (WAN), any combination of the preceding, or any other suitable type of connection may be employed according to the principles of the invention. Preferably, server 60 has an operating system that is capable of supporting one or more users, and multi-tasking, such as UNIX, Windows NT, or LINUX. Multiple user computers 2 may communicate simultaneously with server 60, and each connection may be by a different type of link, e.g., one connection may be by telephone while another may be by the Internet. Similarly, multiple external databases 93, such as those operated by an on-line casino or time-share operator, for example, may communicate simultaneously with server 60, and each connection may be a different type of link as discussed above. In one embodiment, multiple user computers and multiple external databases may communicate with servers 60 and wagering devices 50 via routing/traffic management servers 90. Server 60 may communicate with a particular database by a variety of communication protocols, including file transfer protocol (FTP), electronic mail (e-mail), transfer control protocol/Internet protocol (TCP/IP), ASCII, X-MODEM, Y-MODEM, KERMIT, any combination of the preceding protocols, or any other suitable type of protocol.

Gaming establishments are legally bound to ensure that customers are of legal age to participate in the play of casino games. One method is to check the identification of customers. Fingerprint authentication is another method that may be employed through the use of software and hardware, including an ergonomically designed, intelligent peripheral sensor with a Universal Serial Bus (USB) connector adaptable for utilization in connection with a user computer keyboard and capable of confirming the customer identity upon each logon to the operating system of the invention. Another manner of authenticating a user is to capture the user's personal computer information upon installation and then to perform a comparison upon each login by the user to verify identity. The system may display a message indicating the last date/time that the system was accessed, which may alert the customer of any unauthorized access. In the event of unauthorized access, the user will be prompted to change the password to access the system. Another account security feature permits a customer to establish a daily or other periodic limit on gambling losses. An operator of the remote gaming apparatus 1 provides a remote player or players with the ability to wager on a wagering device 50 based on the player's financial information stored in back office financial data server 10. A remote player may select a "wagering amount" from the player's account employing user computer 2. The system may be designed to convey the game-play outcome of a wagering device 50 to a remote player, utilizing a real-time, or slightly delayed, video feed.

Figure 3:
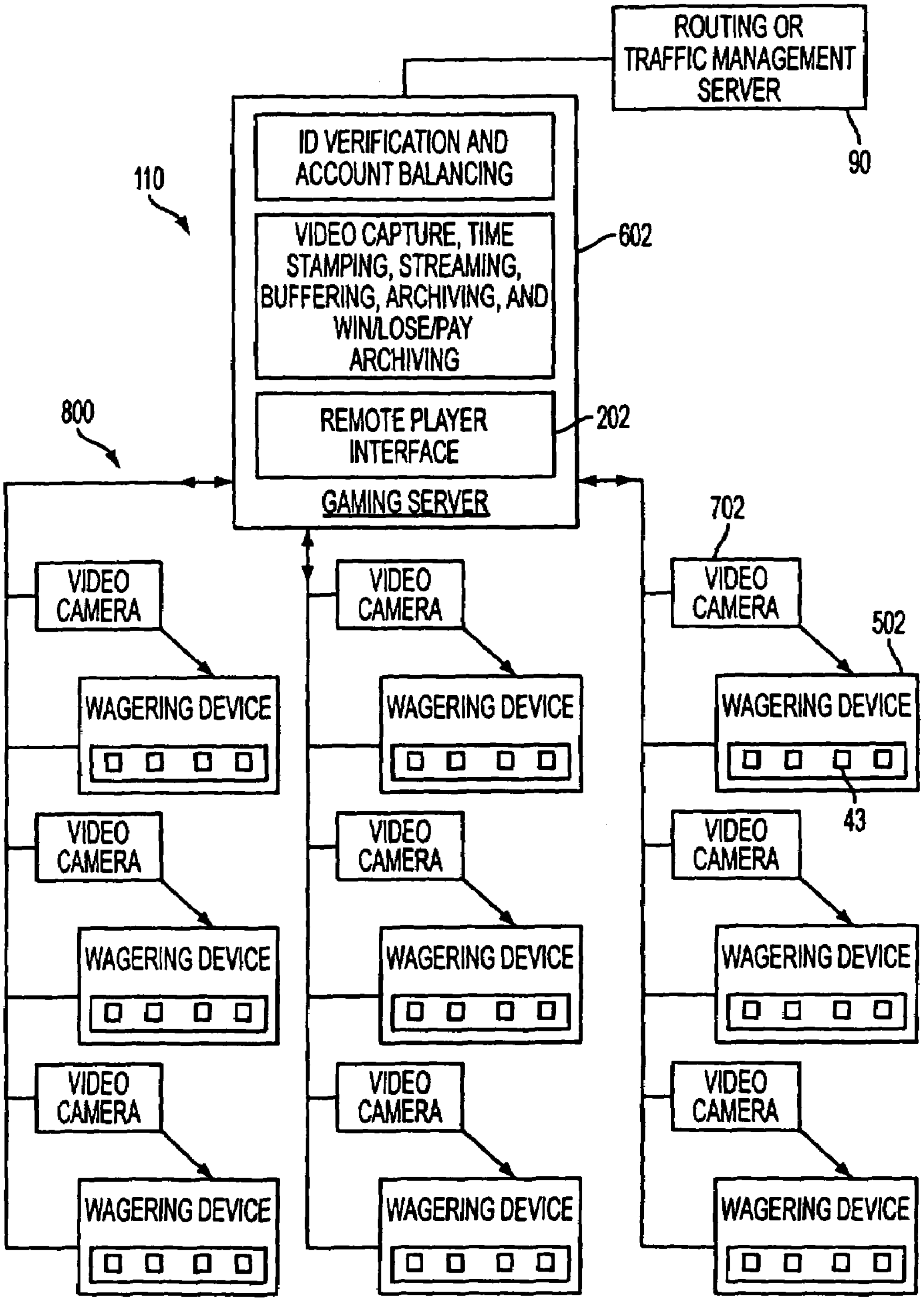
FIG. 3 is a schematic block diagram illustrating an example of a wagering device slot farm, according to the principles of the invention, wherein the wagering devices are coupled to a local area or wide area network, and the network is linked to video cameras positioned to capture and transmit archived video recordings of all the features of the game play with date and time stamps.

Upon access to the remote user computer 2 of the remote gaming apparatus 1, a gaming server 60 may poll the wagering devices 50 in order to determine availability and may query a player's account stored in back office financial data server 10 as is depicted in FIG. 3. In another embodiment represented by FIG. 4, a routing/traffic management server 90 may poll the gaming servers 60 in order to determine availability and may query a player's account in any of the financial servers. Back office financial data server 10 may be configured in combination with verification and account balancing unit 62 as a typical online banking database with user logon and password functions linking users to their accounts. Account reconciliation is performed in real time by balancing game wins or losses with the associated dollar amounts on a per-credit basis by employing verification and account balancing unit 62 where per-credit refers to the number of credits reflected on a wagering devices credit meter, which may reflect credits in any one of a number of denominations including nickels, dimes, quarters, dollars or any other denomination appropriate for the jurisdiction of play. Video capture of significant time-stamped frames of game play may be archived to establish a visual record of a specific wagering device 50 used at a given time by a remote player by utilizing video camera(s) 70 in combination with video capture unit 63 and event archive backup library server 15. The player may then be presented with a wagering device selection page on the visual display 6. This page may display the physical representation of the wagering devices 50 available for play. This page may also initiate a pop-up player account control panel that provides current account information and funds available for play. This account window may also provide the player with a graphical representation of his or her finds and the ability to "drag and drop" funds from his or her account into a particular wagering device 50.

A player may establish an account with the wagering device operator through direct deposit at an operator's physical location, or by any other legitimate method of funds transfer. These funds may be held in a player's account for later game play.

After selecting a wagering device 50, the gaming server 60 routes the player's remote user computer 2 to the selected wagering device 50. Each gaming server 60 may have a fixed IP address, or may be assigned a discreet Internet protocol (IP) address by the routing/traffic management server 90. Once the player's remote user computer 2 is routed through a gaming server 60 to the selected wagering device 50, the associated one or more video cameras 70 may be activated and the user may be given a video feed of the wagering device 50. In combination with the video feed a wagering device control panel may be presented to the player on the visual display 6 of the remote user computer 2. Preferably, this panel mimics the game play inputs located on the physical wagering device 50. In one embodiment a graphically represented pop-up control panel is provided.

The routing/traffic management server 90 may be employed to interface with one or more gaming servers 60 to facilitate routing of the player's remote user computer 2 to the wagering device 50. The routing/traffic management server 90 may handle the initial user identity verification, may identify an available gaming server and associated wagering device, and may link the user's computer with the gaming server. Routing/traffic management server 90 may also handle secondary user identity verification, in a case where a user's identify is verified by a third-party licensee, such as an on-line casino or time-share operator. In this aspect, the third-party licensee may verify that the user is authentic and has sufficient funds available for gaming and then may pass the user to the routing/traffic management server 90. Here, the user may be given access to the wagering devices 50 based on agreements with the third-party licensee as the identity of the user may remain unknown to the routing/traffic management server 90. In one embodiment, the routing/traffic management server 90 verifies that the user was passed from a licensed third party and that the licensed third party has sufficient monetary reserves to cover the potential winnings of the user. After a user is accepted by the routing/traffic management server 90 and given access to wagering devices 50, the routing/traffic management server 90 drops the audio and video feed to maximize bandwidth for additional users; however, the routing/traffic management server 90 may maintain a continuous data connection to the gaming servers 60 in use so that the gaming results may be stored in a number of databases. When a user logs off, the gaming server 60 may reconcile its own internal account database, and may then reconnect with interstitial account server 91, the accounting server 92, or any other server associated with a database through the routing/traffic management server 90, whereby all accounts may be reconciled. For example, the interstitial account server 91 may be an account maintained by a third-party licensee. In one embodiment, a number of licensees' accounts may be maintained by one or more interstitial account servers that facilitate monitoring and regulating a contractually agreed-upon buffer balance, permissioning and authenticating codes and software, and other features associated with tracking operations. Other servers, such as ancillary account servers, may be constructed to capture the type of information required by governing bodies, such as state licensing boards, state and federal taxing agencies, and the like, which require redundant databases for various purposes.

Prior to play, the player may position the mouse cursor over the representation of funds in the account window and may select a desired wager. The wager may then be entered numerically or dragged across the screen of the visual display 6 and dropped onto the area of the screen designed to facilitate the transfer of the wagered amount from the players account directly into the appropriate remote play mechanism of wagering device 50, or, in the alternative, the wagered amount may be used as a deposit to allow a player to use a wagering device 50 that has been enabled for play with credits by the system operator. The remote play mechanism receives the software command to increment the player's credit meter on the physical wagering device 50. In this aspect, once the meter has been incremented, the remote play mechanism confirms the transfer to the gaming system and the player's account may be debited. Preferably, the player's account, and the electronic link between the player's account and the wagering device 50, are locked during this transfer to prevent multiple player/device access and account overdraft. The player may then see the requested wager amount displayed on the credit meter located on the physical wagering device 50 via the video feed. Concurrently, the player may also see his or her updated account information in the graphically represented pop-up account window. The fields utilized in accordance with the invention may be provided in a convenient drop-down menu or toolbar. Of course, the layout of window contents and toolbar options may be modified by the player. In a preferred embodiment, the player may aesthetically modify the layout without affecting the integrity of the accounting database or any other aspect of the invention.

The video feed may be achieved by utilizing network addressable video cameras 70 associated with individual wagering devices. These cameras may be independently network addressable and attached to a gaming server 60, or may be individually attached to dedicated computer processors, or servers that are in turn attached to a central server. The number of video cameras 70 required per wagering device 50 is dependent on the number of camera angles required, the sophistication of the cameras used, the type of wagering device 50 played, and the remote player's individual preferences. In the case of second chance or bonus wagering devices, two video cameras 70 may be utilized. In this instance, one video camera 70 would be focused on the initial game display while the second video camera 70 would be focused on the second chance or bonus display. Of course, more than two video cameras 70 may be employed according to the principles of the invention. Moreover, more sophisticated tilt and swivel camera equipment incorporating sophisticated auto-focusing technologies may be utilized to enhance the gaming experience or to minimize the need for additional cameras.

Once the player sees that the credit meter has been properly incremented, the player may move the mouse cursor to the desired wager amount as determined by the physical wagering device 50 and replicated on the wagering device control panel 4. In one aspect, upon entry to the wagering device control panel 4, a command is sent to the remote user computer 2. The player may then use the remote user computer 2 to instruct the wagering device to increment the bet meter on the physical wagering device 50.

Upon visual confirmation that the bet meter on the physical wagering device 50 has been incremented, the player may position the cursor on the game activation button (typically "play," "spin," or "deal") and may press enter. In this aspect, a transmission may then be sent to the remote play mechanism, which, in turn, sends the physical wagering device the instruction to begin play.

According to principles of the invention, play continues in accordance with the attributes of the physical wagering device 50 with game play controlled by the player from the remote control panel 3. The results of individual game plays may be reflected in the credit meter on the physical wagering device 50. Game play may end when the remote player has run out of credits on the physical wagering device 50 and does not desire to continue playing, or the player wishes to collect the amount remaining on the physical wagering devices credit meter. In the first case, no account adjustment is required and the player may exit this session and return to the wagering device selection page to play another device. The aggregate amount of player losses, for example, the amount that would remain in the physical slot machine in a physical casino environment, may be debited to the interstitial account server 91, which may act as the wagering device account bank. The interstitial account server 91 may reconcile its account database with any ancillary account servers (not shown) over a secure encrypted connection. In the second case, the player requests collection via the appropriate button on the wagering device control panel 4. As discussed above, this action triggers the remote play mechanism to decrement the credit meter accordingly and transfers it over to the player's account window. During this process the player observes that the credit meter may be reset to zero and the account balance may be incremented accordingly. For example, when the win meter is equal to the aggregate amount wagered by the player, there is no interaction. In the case where the win meter is greater than the aggregate amount wagered, that amount is credited from the interstitial account server 91 and debited to the player account as winnings. Once the transaction has been confirmed by the two systems, the player may exit to the wagering device selection page to choose another wagering device 50, or simply exit the system entirely.

Final settlement of a player's account for a player that no longer desires wagering may be accomplished in accordance with the terms and conditions of the operator with whom the account is carried.

In a further preferred aspect, the remote player may control the wagering device 50 by clicking visually represented buttons within the player's browser. The selection of these buttons may send ASCII commands via one or more of links 40, 42 to the gaming server 60 that may send the commands over a LAN or other suitable network to the serial port of a gaming server 60 that is interfaced to the video camera 70 viewing the wagering device 50. The output from the serial port may activate a relay card that translates the ASCII commands to a switch closure of the corresponding switch. A return command may then be sent from the switch back through the system to the gaming server 60 and the remote user's browser to confirm receipt of the remote player's command. As discussed above, wagering devices 50 may be standard wheel and video display-type slot machines, or any other suitable wagering devices, that are connected to a remote player interface. The system may be designed to allow one remote user to control one wagering device 50 at a time. In one preferred aspect, the system is operated on a first-come, first-served approach. Thus, when a remote user's logon ID is verified, and the user chooses a wagering device, that device is locked out from all other users until the first user is logged off that device.

Figure 2:
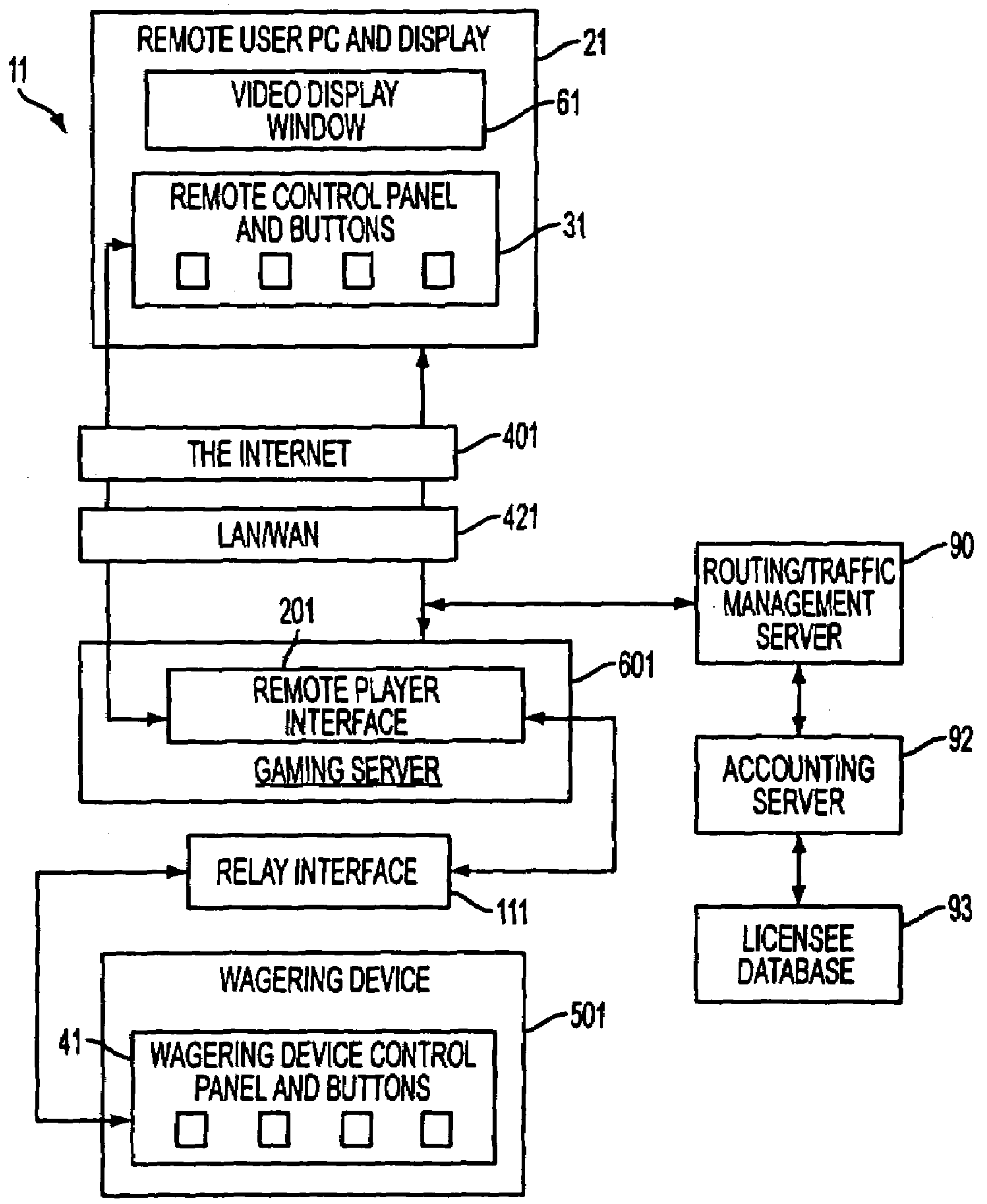
FIG. 2 is a schematic block diagram illustrating a remote player interface that graphically and functionally replicates the input controls of the wagering device as a graphical remote control panel on a remote player's computer, according to the principles of the invention.

In another embodiment, as illustrated in FIG. 2, a player may access a wagering device 501 through a remote gaming apparatus 11 via a remote user device 21. The remote user device 21 may be a computer or other suitable Internet appliance, such as devices having features including a video display 61, communications capability, input capability (mouse and keyboard or touch screen), and any other suitable features. It is understood that for the purposes of this description, the remote user device 21 is presumed to utilize a mouse and keyboard, rather than touch screen capability; however, any suitable input devices may be utilized. The data transferred to and from the remote user device 21 may be transmitted through a network 401 and a secondary network 421. It is understood that the network 401 may be an Internet-based network or any other suitable network. It is also understood that the secondary network 421 may any suitable communication medium, including a private or virtual private network and may include a telephone link, a hard-wired connection, a satellite link or other wireless connection, a LAN, or a WAN. It is further understood that network 401 and secondary network 421 may be implemented individually or together and that they may be a direct baseband, broadband, or any other suitable network communication medium to which the gaming system is in communication. The features of this embodiment may be employed in conjunction with the elements described above and below.

In one aspect, to gain access to a wagering device 501 of the invention, a gaming server 601 via relay interface and game data serial link 111 may poll one or more wagering devices 501 to determine availability and may query a player's account for account information and available funds. A player may then be presented with a wagering device selection page on the video display 61 of the remote user device 21. This page may display either the physical or the virtual representation of the wagering devices available for play. This page also may initiate a graphically represented pop-up player account control panel that provides current account information and funds available for play. This account window may also provide the user with a graphical representation of his or her funds and the ability to numerically enter, or "drag and drop" funds from his or her account into a selected wagering device.

In this embodiment, a remote player interface 201 is configured within a gaming server 601. The remote player interface 201 may receive serial commands from a remote control panel and buttons 31 within a user device 21 having a video display 61. The commands may be processed through a relay interface and game data serial link 111 to activate corresponding buttons 41 on a wagering device 501. Action confirming serial commands may be sent back to the gaming server 601 and the user device 21. Win, lose, and pay results may be displayed in the video display 61 of the user device 21. Of course, event archive server 15 and back office financial data server 10, which are described above, may be utilized in connection with the embodiment discussed in association with FIG. 2.

During play in this embodiment, a virtual rendition the wagering device 501 may be displayed on the video display 61 of the user computer 21. Data are transferred to and from the wagering device 501 via a relay interface and game data serial link 111, which, in turn, is in communication with the remote player interface 201 of the gaming server 601. The communication between the remote player interface 201 and the user device 21 is similar to the communication between the remote player interface 20 and the remote user computer 2, described above. In addition, in a preferred embodiment, account verification and tracking of financial information in the remote gaming apparatus 11 is similar to that described with respect to remote gaming apparatus 1, described above.

FIG. 3 illustrates another alternative embodiment of a remote gaming system 110. In this embodiment, a remote player interface 202 within gaming server 602 receives serial commands from a remote control panel located within a user computer having a visual display, as described above. These commands may be processed through a relay interface to activate corresponding buttons 43 on a wagering device 502 in a wagering device slot farm 800. Action confirming serial commands may be sent back to the gaming server 602 and to the user computer, as described above. Win, lose, and pay results may be displayed in the visual display of the user computer. It is understood that the elements not shown in FIG. 3 may be similar to those discussed above or may be of any suitable type. Of course, multiple traffic servers may be employed to accommodate groups of wagering devices 502 as required by bandwidth limitations of network hardware. Additionally, routers and switching hubs may also be used to link networkable components of the system to optimize bandwidth availability.

Figure 4:
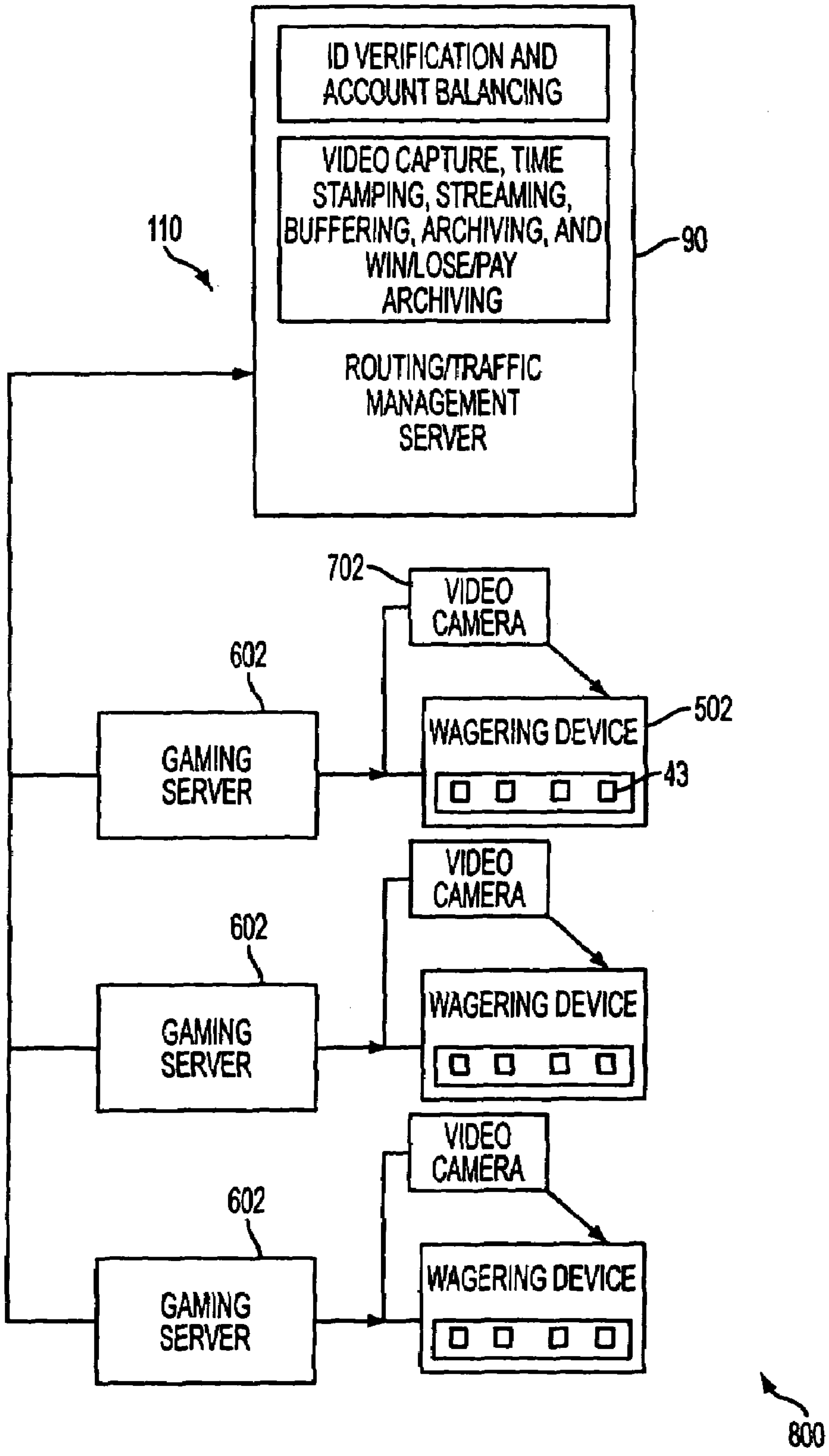
FIG. 4 is a schematic block diagram illustrating another example of a wagering device slot farm, according to the principles of the invention, wherein the wagering devices are connected to gaming servers that are coupled to a routing/traffic management server over a local area or wide area network connection, and the network is linked to video cameras positioned to capture and transmit archived video recordings of all the features of the game play with date and time stamps.

FIG. 4 depicts yet another alternative embodiment of a remote gaming system 110 where wagering devices 502 may be coupled to gaming servers 602 that may be connected to routing/traffic management server 90 and connected over a local area or wide area network (LAN or WAN) connection. The gaming servers 602 may also be networked to video cameras 702 positioned to capture video images of all the features of the game play with date and time stamps. Commands may be employed to activate corresponding buttons 43 on a wagering device 502 in a wagering device slot farm 800. Action confirming serial commands may be sent back to the gaming server 602 and to the user computer. As above, win, lose, and pay results may be displayed in the visual display of the user computer. Of course, it is understood that the elements not shown in FIG. 4 may be similar to those discussed above or may be of any suitable type.

One function provided by the gaming servers 60, 601, 602, 603 of the invention is to interface between the users, video cameras 70, 703, and wagering devices 50, 501, 502. The gaming servers may also maintain a record of all gaming session transaction activity. Each gaming server may use approximately 160 mbps of bandwidth, which may provide about ten gaming servers per T1 line. Of course, the number of users per T1 line may be increased by technological improvements or by user acceptance of lesser quality images.

As discussed above, in one embodiment the streaming software employed in the gaming servers 60, 601, 602, 603 detects a user's bandwidth and automatically optimizes the video presentation accordingly. Each gaming server contains a serial remote player interface circuit board and associated interface software that enable a user to view a remote control panel 3 to control the wagering device buttons 31 and perform funds transfer functions. Certain user transactions in a gaming session may be temporarily maintained on the routing/traffic management server 90, wagering device 50, 501, 502, and gaming server attached to the wagering device selected for the play session. A permanent record may be stored on the accounting server 92. The invention seeks to provide the highest transaction speed possible, while protecting against transaction data loss and maintaining acceptable quality.

Figure 5:
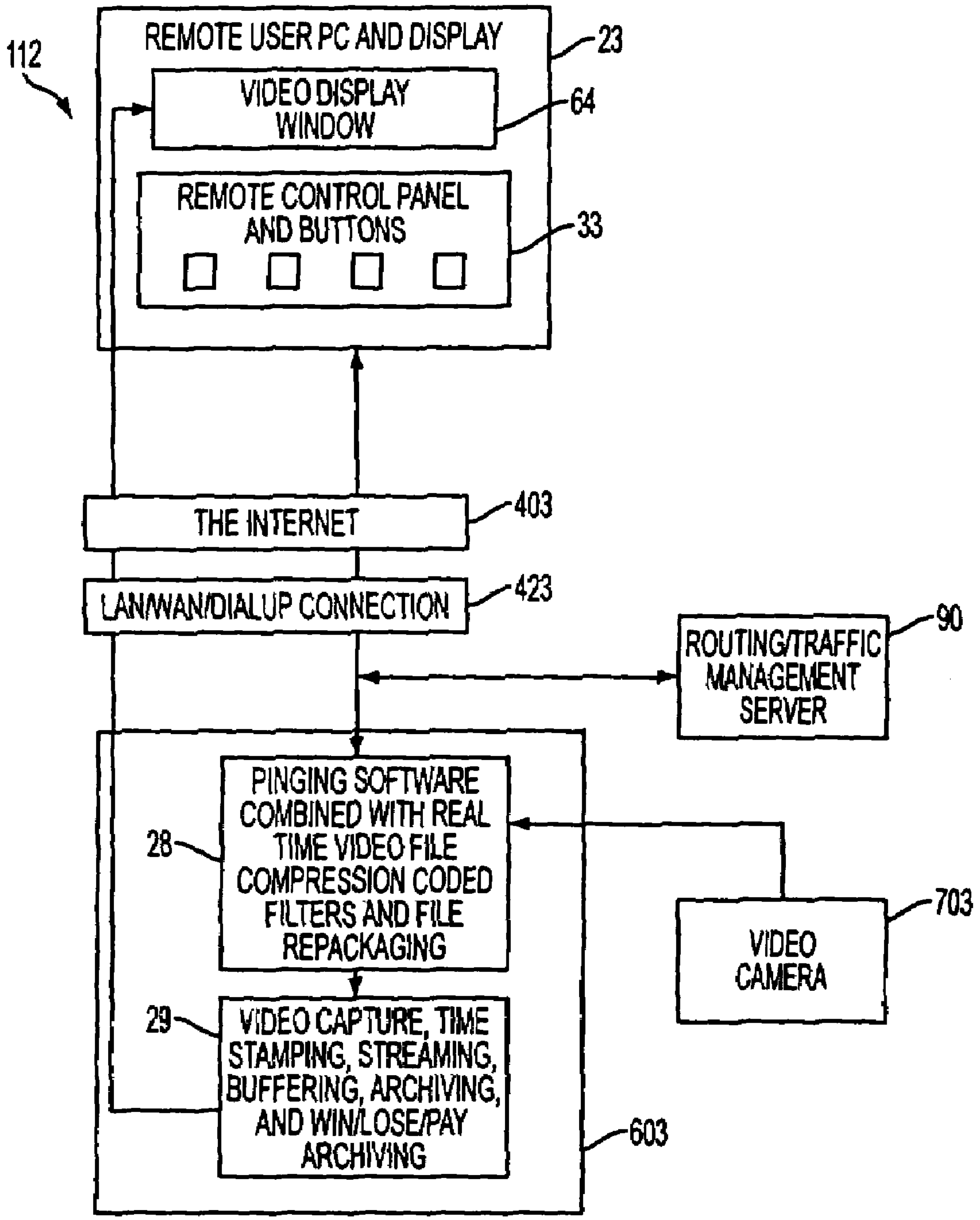
FIG. 5 is a schematic block diagram illustrating a high bandwidth connection to a gaming system, as well as elements that enable automatic bandwidth detection of a remote user's data connect speed, and the subsequent optimization of visual image and data transmission through encryption and buffering, according to the principles of the invention.

FIG. 5 illustrates a system 112 having automatic bandwidth detection of the connection speed of a remote computer 23 via pinging/video compression software 28, configured within the software architecture of a gaming server 603. The pinging portion of the software is constructed to determine the remote user's connection speed, and the appropriate video file compression codec is applied to a video capture of a wagering device to minimize the bit rate required to transmit the video capture. The video output from video camera 703 may be split into a direct video stream that may be sent to remote users with a high bandwidth connection. A buffered/compressed video stream created from the video output may be archived in video archiving and file generation software 29 (also configured within gaming server 603). This buffered/compressed video stream may also be transmitted to remote users via a low bandwidth connection to be played as a delayed full frame video file on the remote computer 23 via video display 64. It is noted that this automatic bandwidth detection apparatus and method is contemplated for use with all of the embodiments presented herein as well as with any other applications which require video compression through such a scheme. It is further noted that this system 112 is contemplated for use with one or more wagering devices as discussed above and any other suitable combination of elements discussed above.

Several choices for camera video streaming are available, including six to ten second delayed Windows/Real media encoded streaming, less than one second delayed variable compression rate MPEG4 and motion JPEG, or other suitable video streaming options. While higher resolution and frame rates are achievable with encoded streaming, the inherent delay may cause user frustration given the extended wait times for game results. Low latency image distribution is achievable with proprietary MPEG4 but the reduced resolution may diminish user satisfaction due to the subtly fuzzy images. In one embodiment of the invention, if the system senses that a user does not have the latest streaming video "code" on board, then the appropriate updated codec may be sent for download prior to a gaming session.

Audio may be transmitted concurrently with video, or the .wav files may be stored on a user's hard drive to minimize bandwidth usage and may be called as needed by the browser actions. In one embodiment, Wave files identical to the true game sounds may be launched when the game sends a trigger signal from the wagering device software.

The invention will be further described in the following example, which does not limit the scope of the invention described in the claims. The invention contemplates the use of some or all of these parameters, which may be employed in any number of sequences.

Overview Example

A remote customer using one aspect of the invention described in this specification may encounter the following parameters.

1. A customer may establish a communication link to a routing/traffic management server through any supported Internet browser.

2. The customer's identity may be authenticated utilizing hardware and/or software security checks maintained on an authentication server and in cooperation with the routing/traffic management server.

3. After authentication of the customer's identity, the routing/traffic management server may poll gaming servers and may provide a graphical user interface to display the availability of the wagering devices to the customer.

4. The customer may choose a wagering device from a menu of "hot-linked" graphic representations of banks of wagering devices, including slot machines.

5. The routing/traffic management server may control a router that opens a channel to a gaming server associated with the selected wagering device.

6. The routing/traffic management server may then route the customer to a gaming server that may determine the customer connect speed/throughput capability and may then optimize the wagering device play operation.

7. A video camera interfaced to the gaming server may display an image of the wagering device through a LAN, WAN, the Internet, or any other suitable connection, using a Java or other window in the customer's browser window contained within a pre-installed client software application.

8. A remote control panel, emulating the actual control panel of the selected wagering device, may be displayed below the video display of the wagering device in the customer's browser window.

9. The customer may transfer funds from a customer's enrollment account to a wagering device and may do so multiple times, if desired, during a play session. If the customer logs in via a third-party licensee, then the accounting server may communicate with the associated licensee's funds server for customer logon properties and available funds information in connection with access to the system's wagering devices. If an interface for communication is not available, regular updates from the funds server to the accounting server may be performed. For example, the routing/traffic management server may direct the request for funds to the account database server that then queries the licensee's funds server for the customer's account information and available funds. The buttons on the remote control panel may be disabled awaiting processing. Of course, the steps relating to transfer of funds may be bypassed for contests.

10. If the transfer request is granted, the customer account on the licensee's funds server is decremented by the requested amount. The requested amount and remaining available account balance information may then be determined, stored, and sent to the account database server, routing/traffic management server, and gaming server. If a transfer request is not granted, the customer may receive an appropriate message.

11. Once the gaming server has confirmed receipt of the balance information, the remote control panel may then display the credits transferred and enrollment account balance. The remote control panel buttons may then be enabled.

12. The customer may choose a "bet" amount and activate the wagering device through the remote player interface circuit board, which enables the wagering device for remote play and triggers the buttons on the wagering device in response to commands from the remote customer's actions on the remote control panel in the customer's browser window. The video camera may be activated, and "stream rate" may be adjusted, by the gaming server to stream either video, or a buffered video file, to the remote customer's video display window. If buffered video is needed, the system (either the server computer, network gaming server, or the image capture computer, or combination of these devices, or other suitable conversion and transmission device(s)) converts the video camera output to a compressed video file, and transmits the file to the remote customer's computer, where it may be played back in either a Java window, or within Real Player, Windows Media Player, or some equivalent software. Audio may be provided to enhance the gaming experience through either audio streaming, client computer resident .WAV files, or the like, associated with the appropriate events occurring on each wagering device.

13. With specificity regarding betting, the customer then may select a bet amount by clicking the "bet one" or "bet max" buttons on the remote control panel. The remote control panel may display the "bet" field incremented and the "credits" field decremented. The customer may then select the "spin" or "deal draw" button on the remote control panel to start the game. If "bet max" is selected, then the game will automatically start. In one aspect, all buttons on the remote control panel may then be disabled. When the game ends, the camera server "credits" may be transferred to the accounting server for storing in the transaction detail and balance reconciliation databases. The buttons on the remote control panel may be enabled when a "Current Credits" update and balance update from the accounting server is received, and a "Credits" field update is processed by the gaming server database. The betting steps may be repeated by the customer: (a) until there are zero credits on the remote control panel; (b) until the customer transfers remaining credits back to the customer's enrollment account located in the system's funds server; (c) until the customer transfers remaining credits back to the customer's enrollment account located in the licensee's funds server; or (d) the customer changes wagering devices.

14. The win/loss result of each wagering device event may be reflected in an updated credit balance of the remote customer's browser window, as well as recorded in the gaming server and the accounting server. The system may track detailed session information including customer and licensee identification, time played for each device, wagering device identification, win/loss amounts, funds transfer transactions, and date/time stamp of all transactions. Game play records and accounting may be kept on the wagering device, accounting server, and on the applicable camera server controlling the device in play. In one aspect, the accounting server will maintain a permanent record.

When a remote customer leaves the system or changes wagering devices, the customer's funds account balance may be reconciled based on the difference between the credits remaining and the total credits transferred by the customer from a licensee funds database. This amount may be recorded in the slot bank database located in the accounting server. Customer win amounts may be subtracted from the applicable third-party licensee float account balance and customer losses are added to the balance and may employ the interstitial or ancillary account servers to do so. Each licensee may maintain a minimum balance in a float account, which emulates a slot bank, with the system server.

Figure 6:
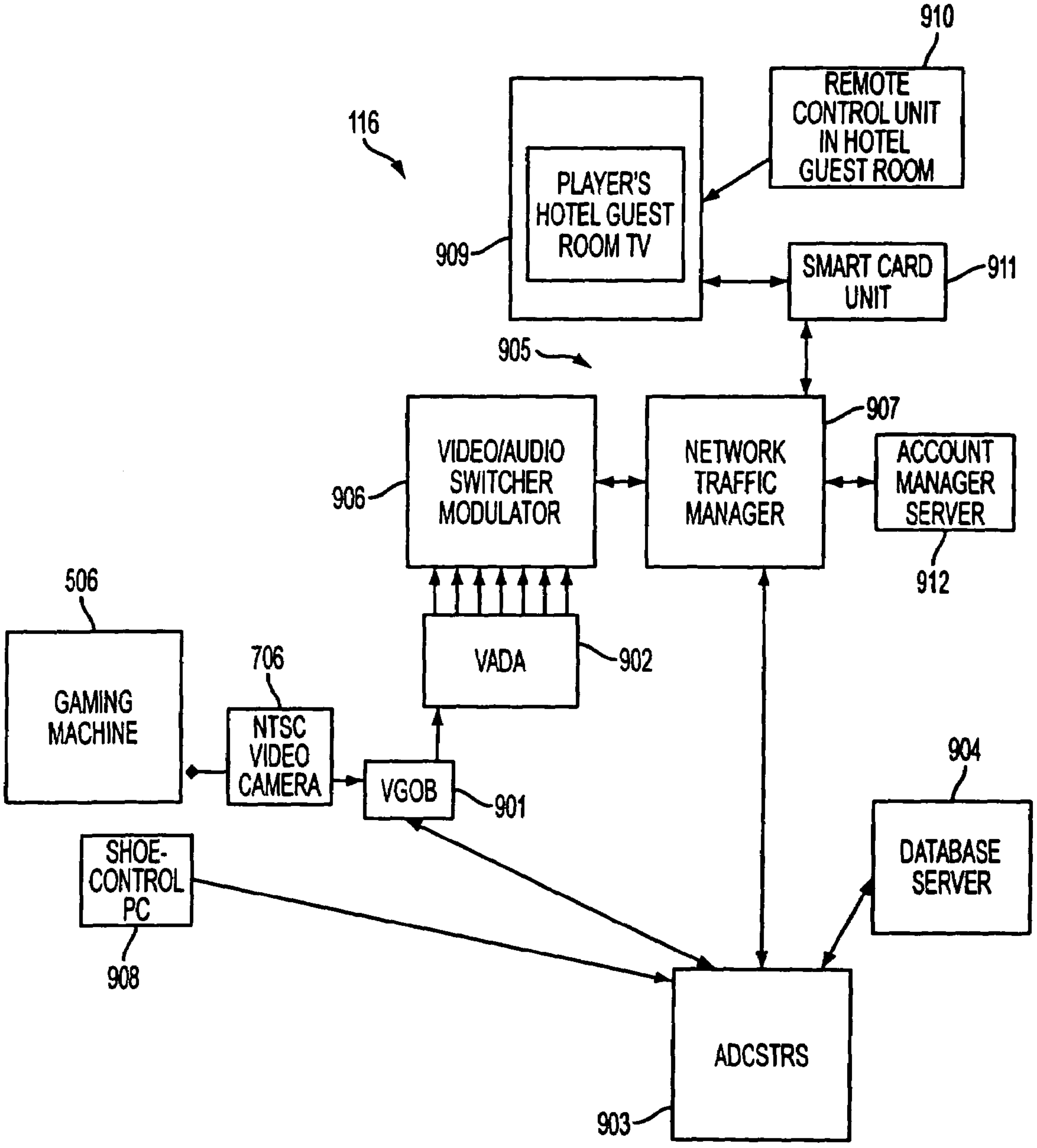
FIG. 6 is a schematic block diagram illustrating a system for remotely participating in a game, including a video display, a control device, a video/audio distribution amplifier, a video graphic overlay board, and apparatus for linking the video display and control device to the game, according to the principles of the invention.

FIG. 6 illustrates a system 116 having a camera 706, pointed at a gaming machine 506, a microphone/amplifier combination (MAC) (not shown), a video/audio distribution amplifier (VADA) 902, and a video graphics overlay board (VGOB) 901 on the output of the camera 706. The VGOB 901 may be located between the camera 706 and the VADA 902. System 116 preferably sends the same visual data to all players "seated" at tables in their rooms and further includes an account data/control signal conversion/table routing server (ADCSTRS) 903, an SQL or other suitable database server 904 or other appropriate server, and a network traffic manager rack 905. The video data in this and any of the other embodiments presented herein may be transmitted in the National Television Standards Committee (NTSC), MPEG-1, MPEG-2, or any other suitable format. The gaming machine 506 in this and in any of the other embodiments presented herein may be a traditional standalone device such as a reel spinning slot machine, a video-based slot machine, a video lottery terminal, or any other suitable electrical and/or mechanical gaming device, such as single user video game machines for playing blackjack, poker, craps, baccarat, keno, roulette, and the like. The gaming machine 506 may also be an actual table or device staffed by a person, including games such as blackjack, craps baccarat, keno, roulette, and the like.

System 116 may operate and interface with the location of the remotely located player as described below. It is noted that this preferred embodiment describes transmitting information from a gaming machine 506 to a guest room in a hotel via an in-room video distribution system. However, any suitable network, such as the Internet, a LAN, a WAN, a dialup connection, or any combination of these networks may be used. Further, it is understood that the remotely located player may be in any remote location from which a connection to the gaming table or device and associated components of system 116 may be accessed.

In this embodiment, a card game is described. However, as discussed above, any suitable game may be played utilizing the invention.

In this embodiment, a high-resolution NTSC video camera 706 with a wide enough aspect ratio to clearly show the entire gaming machine 506, a dealer (not shown), and card denominations (not shown), may be fed through the VGOB 901, then into VADA 902. The video signal may then be split into as many NTSC or other feeds as there are players accessing the seats at the table from their rooms. The dealer's audio may be acquired with a microphone through an amplifier (not shown). The amplifier may provide multiple audio outputs, one associated with each video feed to the video/audio switcher modulator 906 and the network traffic manager 907.

For a card game, a card reading shoe (not shown), which may be a Mikohn shoe or any other suitable type, may present the card data that may be audited as the cards that are dealt. The output from the card-reading shoe may be integrated into a DOS-based shoe-control PC 908 and received as text data over an RS-232 connection or any other suitable connection. The card data may contain card denomination, player position, and bet amount. It is contemplated that card suit information may be provided as well. The shoe-control PC 908 may be any suitable computer system, and any suitable connection modality may be used in place of the RS-232 connection discussed above.

The shoe-control PC 908 may, in turn, be interfaced to the ADCSTRS 903 through a serial cable. The chip data may be emulated in the ADCSTRS to provide a placeholder for each user to enable the shoe data output.

The data display from the shoe-control PC 908 may be in a DOS text format. However, other data formats are contemplated by the invention and may include a custom protocol conversion to trigger a GIF-based card image library overlaid, or displayed, on a player's in-room TV 909 or computer display. The specific location of the card images, as well as their size and form, may be determined by a variety of factors.

"Bet displays" (not shown) may be located at the gaming machine 506 to give player choice cues to the dealer. These may consist of either a small LED display, 4 inches-by-6 inches, for example, or several large LCD display monitors mounted in the dealer's field of view. Other display types may also be implemented.

For example, when blackjack is the card game played, a blackjack player in a hotel room may enter command signals through buttons on the television's 909 remote control unit 910 into smart card unit 911 mounted in the television 909. These signals may then be sent from the smart card unit 911 through the television's RJ-59/U cable to the network traffic manager 907. The network traffic manager may then identify the room address.

The buttons on the remote control 910 may be used to select menus on the television 909 that link the player to a series of blackjack game choices. Although these choices may be presented in the same or a similar manner as presenting movie selections for in-room viewing, any suitable manner of presentation is contemplated by the invention.

System 116 may have various menus and graphics to direct users to the appropriate gaming machines 506, allow users to check balances, and return to the regular menu for the television 909. The menus and graphics for gaming will preferably be installed on the network traffic manager 907 at a resolution of 640×480.

A sample menu path for the system 116 offering blackjack is as follows: A user logs on and goes to a blackjack table menu; this menu may be found as an available choice on the main menu on the television 909. The user may then choose a seat at a gaming machine 506, such as a blackjack table, and is preferably sent directly to an available seat. Additional choices may also be provided, including numerical links to other menus, lobby, account balances, etc.

When a specific seat at a gaming machine 506 is chosen, the network traffic manager 907 routes the user's room address to an address on the video/audio switcher modulator 906, as well as an associated address in the ADCSTRS 903 to link the user's room to a seat at the gaming table 506.

The ADCSTRS 903 may then link a user's room number to a gaming machine seat address to allow user control signals from the television 909 remote control 910 to place bets, request cards, split, double down, and communicate any other game-related actions to the dealer. The ADCSTRS 903 may also acquire card denomination data from the card-reading shoe PC 908 and process all resultant data to and from the user's control signals, the shoe, and the gaming machine 506, through to the SQL or other suitable database server 904, and any table-mounted bet displays.

The software preferably used for the ADCSTRS is multi-table, multi-seat, multi-user routing package that may allow simultaneous two-way data and simultaneous one-way video and audio transfer between multiple remote display/control signal input sources, the VGOB 901, a central server, and a back office data server. For blackjack and other card games, the software package may preferably send and receive player-specific card image triggers, account data, and bet inputs. The ADCSTRS 903 may provide the triggers that may determine the graphic or alpha numeric overlay displays generated by the VGOB 901 on top of the gaming machine 506 video signal.

The ADCSTRS 903 may interface with the network traffic manager 907 through a serial RS-232 connection. The ADCSTRS 903 software may be configured with a multitude of gaming table seat "code modules." Each of these small blocks of code may handle all the required operational elements for one gaming machine. Many code modules may run simultaneously on one ADCSTRS 903 since the bulk of the bandwidth needed for each blackjack table seat video/audio output from the VADA 902 may be handled by the video/audio switcher modulator 906.

The television 909 remote control 910 command signals, as well as the user's financial data, bets, and win/loss activity, may be processed in, or through, the ADCSTRS 903 server. The account-related signals may be sent through the network traffic manager 907 to an in-room folio account management server 912.

The buttons on the television 909 remote control 910 may provide all the necessary triggers for the game play functions. More complex crediting and functionality may be achieved through the activation of a second layer of number commands.

In this system 116, the remote control signals may be converted in the ADCSTRS 903 to serial commands that may be passed along to the VGOB 901. The VGOB 901 may be a simple "in-line" NTSC graphic overlay board installed on the NTSC video line between the camera 706 and the VADA 902. The VGOB 901 may display on-screen instructions, bet/play amount displays, and account balance displays overlaid on top of the gaming machine 506 images. The serial input/output link to the VGOB 901 preferably originates at the ADCSTRS 903, which may then transmit the character alphanumeric graphic display commands.

The VGOB 901 may pass the gaming machine NTSC video images through to the video/audio switcher modulator 906 while overlaying images or text in real time. A code package within the gaming machine room/table seat routing code on the ADCSTRS 903 may be used to translate and send the remote control 910 commands from a hotel room to an associated gaming machine 506, while simultaneously sending usage instructions and/or account data as an overlay graphic on the blackjack table image in real time; this may serve to eliminate the need for a PC for every remote game player.

If the VGOB 901 is a serial device, an equal number of serial outputs from the ADCSTRS 903 may be required for every gaming machine seat in the system. However, the VGOB 901 may be reconfigured to be a network device, and, thus, fewer ADCSTRSs 903 may be required per system 116 and the associated costs of each system 116 may be reduced.

The code resident on the ADCSTRS may populate the user account database. Whenever a file is changed or added to the software, the system 116 may be configured to automatically update all component software. The version control server, resident on the ADCSTRS 903, may automatically uninstall the old version elements if necessary and update all software or firmware as follows:

a) Update the version number every time a file is changed;

b) Tag each changed file and associate the new files to the new version number;

c) Automatically uninstall the old version prior to installing a full install package; and d) In the case of system file updates, the update server checks all system software in each module at startup and updates files as necessary.

It is understood that although a card game is used to describe the features of this embodiment, the features of this embodiment may be used with any other type of electronic, electromechanical, or "live" game. It is further understood that the features of this embodiment may be employed in conjunction with the elements described above and below.

Figure 7:
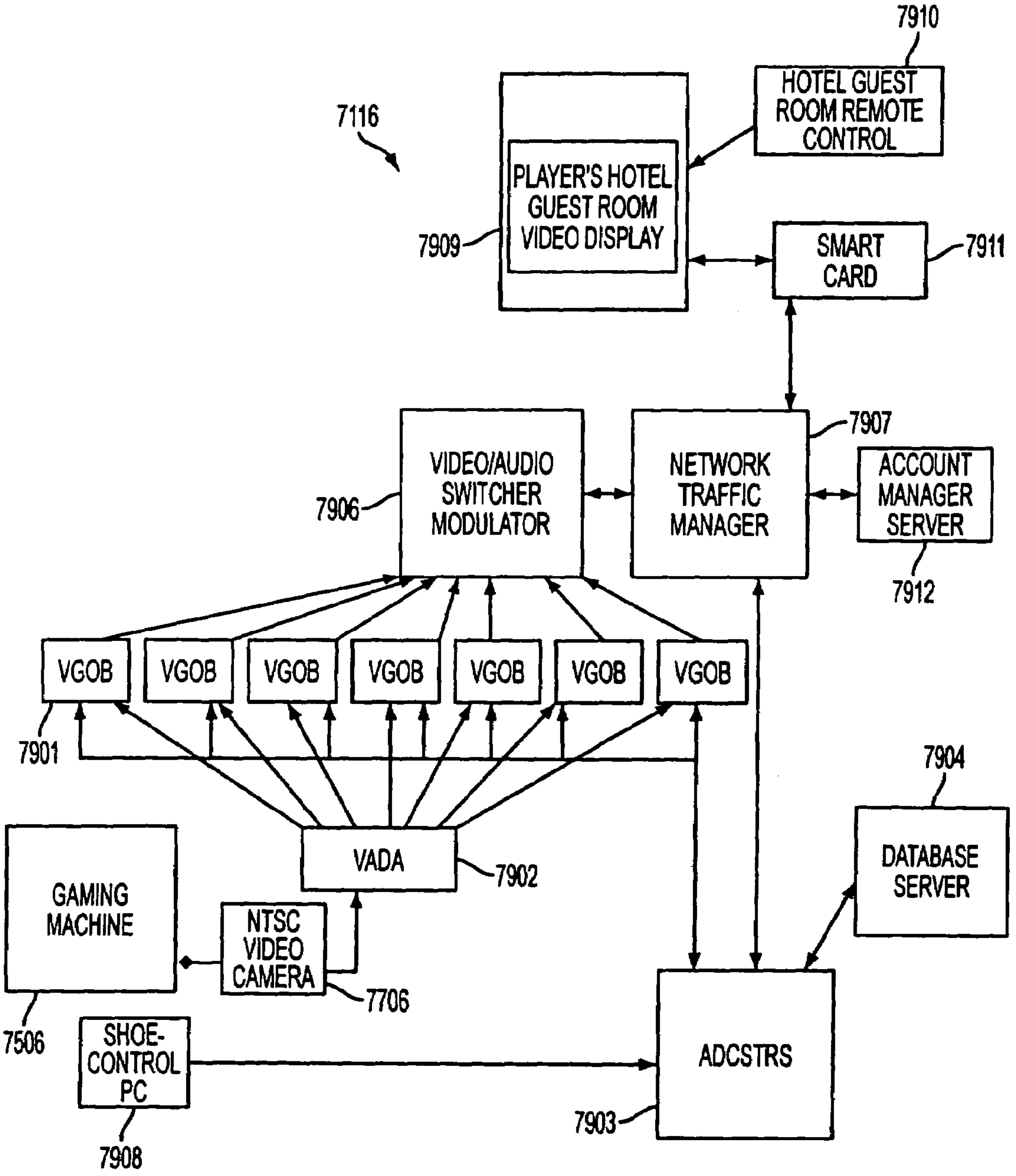
FIG. 7 is a schematic block diagram illustrating another example of a system for remotely participating in a game, wherein multiple video graphic overlay boards may be used, according to principles of the invention.

FIG. 7 illustrates an alternative embodiment of a system 7116 having a camera 7706 pointed at a card or gaming table 7506, a MAC (not shown), a VADA 7902, a VGOB 7901 on the output of each video feed from the VADA 7902 and ahead of the video/audio switcher modulator 7906. The system 7116 preferably sends different visual data to all players "seated" at the table in their rooms and further includes an ADCSTRS 7903, a SQL or other suitable database server 7904 or other appropriate server, and the network traffic manager rack.

In this embodiment, a card game is described. However, as discussed above, any suitable game may be played utilizing the invention.

The embodiment described herein has several additional features to other the embodiments presented. It is contemplated that the features described herein may also be employed in conjunction with the other embodiments of the invention. For a blackjack game being played, the graphics package on each VGOB 7901 may preferably show each player the player's "down card" without showing it to the other players, and may visually confirm the "up card." Each player's account balance may also be overlaid on that player's in-room video display 7909 without showing this balance to the other players.

System 7116 may preferably operate and interface to the equipment in the players' locations as described below. The camera 7706 is preferably a high-resolution NTSC or other suitable format video camera with a wide enough aspect ratio to clearly show an entire gaming table 7506, the dealer, and the card denominations, and is preferably aimed at the gaming table 7506; however, any suitable camera or transmission format may be used. The camera 7706 output may be fed into a VADA 7902. The video signal may be split into as many feeds as there are players accessing the seats at the table from their rooms. Of course, the gaming table 7506 may be used for blackjack or any other card game or any suitable type of gaming.

The video outputs from the VADA 7902 may be fed through VGOBs 7901, then routed into the video/audio switcher modulator 7906. The dealer's audio is preferably acquired with a microphone through a small amplifier. The amplifier may provide multiple audio outputs—associated with each video feed—and feed them to the video/audio switcher modulator 7906.

A card-reading shoe (not shown), which identifies the suits and denomination of the cards, may be mounted on the gaming table 7506 and may provide the card data needed to audit the cards that are dealt if, for example, blackjack is being played. The output from the card-reading shoe may be integrated into a DOS-based or other suitable format shoe control PC 7908 and received as text data over an RS-232 or other suitable connection. The data may contain card denomination, player position, and bet amount. Card denomination and suit information may be provided as well.

This shoe-control PC 7908 may be interfaced to the ADCSTRS 7903 through a serial or other cable. Preferably, the shoe-control PC 7908 expects to see a bet amount from table position chip readers. In a preferred configuration, chip data may be emulated in the ADCSTRS 7903 to provide a placeholder for each user to enable the shoe data output.

In a preferred embodiment, the data display from the shoe is in a DOS text format; however, any suitable format may be used. From this, a custom protocol conversion may be implemented to trigger a GIF-based card image library overlaid, or displayed, on a user's in-room TV or computer display.

"Bet displays" may be located on the gaming machine 7506 to give player choice cues to the dealer. These cues may consist of either a small red LED display, for example, 4 inches-by-6 inches, at each player seat, or several large LCD display monitors mounted in the dealer's field of view, or any other suitable display.

A player in a hotel room may enter command signals through the TV remote control unit buttons 7910 into a smart card 7911 mounted in the TV 7909. These signals may be sent from the smart card 7911 through the TV's RJ-59/U cable, or any other suitable connection, to the network traffic manager 7907. The network traffic manager 7907 preferably identifies the room address. The buttons on the TV remote control 7910 may be used to select menus on the in-room TV 7909 that link the player to a series of gaming machine 7506 choices. Although these choices may be presented in the same or a similar manner as presenting move selections for in-room viewing, any suitable manner is contemplated by the invention. The menus and graphics may be created for the system 7116 to direct users to the appropriate gaming machines 7506, allow users to check balances, and return to the main menu and regular TV.

The blackjack or other game menus and graphics are preferably created in 640×480 resolution and installed on the network traffic manager 7907. The menu path may be as follows: A user logs on and goes to a gaming machine 7506 menu which is found as an available choice on the main menu. The user may choose a seat at a gaming machine 7506 and is preferably sent directly to an available seat. Additional choices may be provided, including numerical links to other menus, lobby, account balances, etc. When a specific seat at a gaming machine 7506 is chosen, the network traffic manager 7907 may route the user's room address to an address on the video/audio switcher modulator 7906, as well as an associated address in the ADCSTRS 7903 to link the user's room to a seat at the gaming machine 7506.

For blackjack, the ADCSTRS 7903 preferably links a user's room number to a gaming machine 7506 seat address for playing, allows user control signals from the TV remote control 7910 to place bets, request cards, split, double down, and communicate any other blackjack-related game actions to the dealer. The ADCSTRS 7903 may also acquire card denomination data from the card-reading shoe and may process all resultant data to and from the user's control signals, the shoe, and the gaming machine 7506, through to the SQL or other suitable database server 7904, and any table-mounted bet displays.

The software used for the ADCSTRS 7903 is preferably a multi-table, multi-seat, multi-user routing package that allows simultaneous two-way data, and simultaneous one-way video and audio transfer between multiple remote display/control signal input sources, the VGOBs 7901, a central server, and a back office data server 7904. The software package may send and receive player specific card image triggers, account data, and bet inputs. The ADCSTRS 7903 may provide the triggers that will determine the graphic or alphanumeric overlay displays generated by the VGOB boards 7901 on top of the gaming machine video signal.

The ADCSTRS 7903 preferably interfaces to the network traffic manager 7907 through a serial RS-232 connection. The ADCSTRS software may be configured with a multitude of gaming table seat "code modules." Each of these small blocks of code may handle all the required operational elements for one gaming table seat. Many code modules may run simultaneously on-one ADCSTRS 7903 since the bulk of the bandwidth needed for each gaming table seat video/audio output from the VADA 7902 may be handled by the video/audio switcher modulator.

The TV remote control 7910 command signals, as well as the user's financial data, bets, and win/loss activity, may be processed in, or through, the ADCSTRS 7903. The account-related signals may be sent either through the network traffic manager 7907 to an in-room folio account management server or sent on to an account management SQL or other suitable database server or both.

The buttons on the TV remote control 7910 may provide all the necessary triggers for the game play functions. More complex crediting and functionality may be achieved through the activation of a second layer of number commands. In this system 7116, the remote control signals may be converted in the ADCSTRS 7903 to serial commands that may be passed along to the VGOB boards 7901. The VGOB boards 7901 are preferably simple "in-line" NTSC graphic overlay board installed on the NTSC video line between the VADA 7902 and the hospitality networks' ISP. The VGOB boards 7901 may display on-screen instructions, bet/play amount displays, and account balance displays overlaid on top of the gaming table 7506 images. The serial I/O links to the VGOB boards 7901 may originate at the ADCSTRS 7903, which may transmit the character alphanumeric graphic display commands.

Preferably, the VGOB boards 7901 pass the blackjack or other game video images through to the video/audio switcher modulator, while overlaying, for example, 11 lines of 28 characters of text in real time. A code package may be located within the gaming table room/table seat routing code on the ADCSTRS 1903 to translate and output the remote control commands from a hotel room to an associated gaming machine 7506, while simultaneously sending usage instructions and/or account data as an overlay graphic on the gaming table image in real time, thus eliminating the need for a PC at every gaming machine. These gaming machines may be used, as discussed above, for any suitable electronic, electromechanical, or "live" game.

For card games, the graphics package on each VGOB board 7901 will preferably show each player his or her down card without showing it to the other players and visually confirm the up card. In a preferred embodiment, each player's account balance may be overlaid on their in-room video display without showing the balance to the other players.

Since the VGOB is preferably a serial device, an equal number of serial outputs from the ADCSTRS 7903 may be required for every gaming table seat in the system. If the VGOB is reconfigured to be a network device, fewer ADCSTRSs per system may be used, and the associated costs of each system may be reduced.

The code resident on the ADCSTRS 7903 may populate the user account database. Whenever a file is changed or added to the software, the system preferably automatically updates all component software. The version control server, resident on the ADCSTRS 7903, may automatically uninstall the old version elements, if necessary, and update all software or firmware as follows:

a) Update the version number every time a file is changed;

b) Tag each changed file and associate the new files to the new version number;

c) Automatically uninstall the old version prior to installing a full install package; and d) In the case of system file updates, the update server checks all system software in each module at startup and updates files as necessary.

It is understood that although a card game is used to describe the features of this embodiment, the features of this embodiment may be used with any other type of electronic, electromechanical, or "live" game. It is to be further understood that the features of this embodiment may be employed in conjunction with the elements described above and below.

Figure 8:
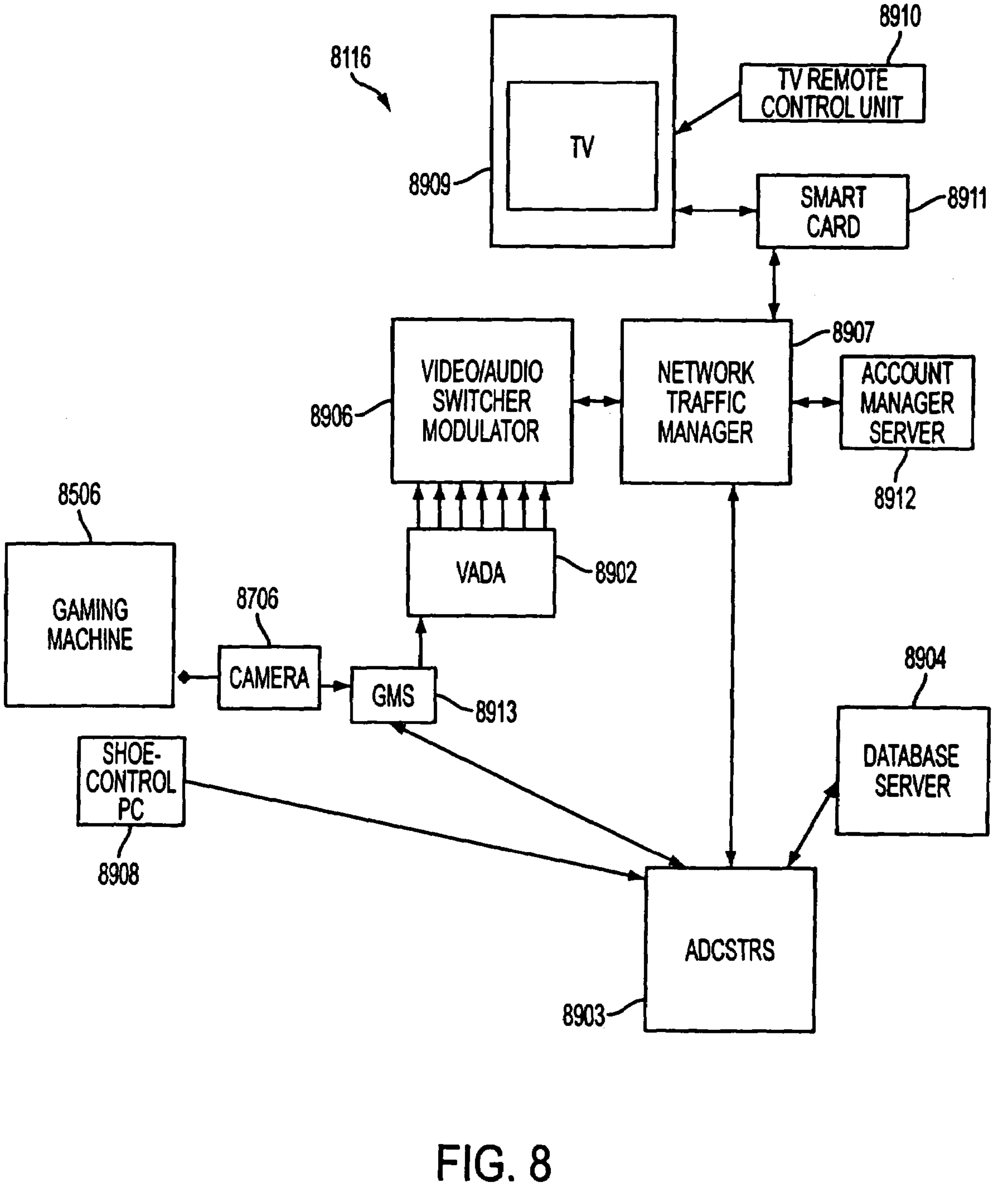
FIG. 8 is a schematic block diagram illustrating a further example of a system for remotely participating in a game, wherein a game seat server may be used with a video/audio distribution amplifier, according to principles of the invention.

FIG. 8 illustrates a further alternative embodiment of a system 8116 having a camera 8706 pointed at a gaming machine 8506, a MAC (not shown), a GMS 8913 that sends exactly the same visual data to all players "seated" at the table in their rooms in the case of a card game, a VADA 8902, an ADCSTRS 8903, a SQL or other suitable back office accounting database server 8904, and an existing traffic manager rack 8907.

The embodiment described herein has several additional features to the other embodiments presented. The system 8116 will preferably operate and interface to in-room configurations as follows. A high-resolution NTSC or other suitable format video camera or any other suitable camera 8706 with a wide enough aspect ratio to clearly show an entire gaming, table 8506, the dealer, and the card denominations, may be fed through a GMS 8913, then into a VADA 8902. The video signal may be split into as many feeds as there are players accessing the seats at the table from their rooms. The dealer's audio may be acquired with a microphone through an amplifier. The amplifier may provide multiple audio outputs, associated with each video feed, to the video/audio switcher modulator.

The card-reading shoe may be one sold by Mikohn but may be of any suitable type; it will preferably provide the card data needed to audit the cards that are dealt. The output from the card-reading shoe may be integrated into a DOS-based or other suitable format shoe control PC 8908 and received as text data over an RS-232 or other suitable connection. The data may contain card denomination, card suit, player position, and bet amount.

The shoe-control PC 8908 may be interfaced to the ADCSTRS 8903 through a serial cable. Normally the shoe-control PC expects to see a bet amount from a table position chip reader. In a preferred configuration, the chip position data will be emulated in the ADCSTRS 8903 to provide a placeholder for each user to enable the shoe data output.

The data display from the shoe may be in a DOS text format or any other suitable format including a custom protocol conversion to trigger a GIF-based card image library overlaid, or displayed, on the users in-room TV 8909 or computer display.

"Bet displays" may be located at the table to give player choice cues to the dealer. These cues may consist of either a small red LED display, for example, 4-inches-by-6 inches, at each player seat, or several large LCD display monitors mounted in the dealer's field of view, or any other suitable display.

In a preferred embodiment, when the system is used for blackjack, a player in a hotel room enters command signals through the TV remote control unit 8910 buttons into the smart card 8911 mounted in the TV 8909. These signals may be sent from the smart card 8911 through the TV's RJ-59/U cable to the network traffic manager 8907, where the network traffic manager 8907 may identify the room address.

The buttons on the TV remote control 8910 may be used to select menus on the in-room TV 8909 that link the player to a series of gaming table choices, such as blackjack tables. Although these may be presented in the same or a similar manner as presenting movie selections for in-room viewing, any suitable manner of presentation is contemplated by the invention. Menus and graphics may be used by the system 8116 to direct users to the appropriate gaming tables, allow users to check balances, and return to the main menu and regular TV. The gaming menus and graphics are preferably created in 640×480 resolution and installed on the network traffic manager 8907.

The menu path may operate as follows: a user logs on and goes to a gaming table menu, which is found as an available choice on the main menu. The user may then choose a seat at a gaming machine 8506 (for example, a blackjack table), and is preferably sent directly to an available seat. Other additional choices may include numerical links to other menus, lobby, account balances, etc. When a specific seat at a gaming machine 8506 is chosen, the network traffic manager 8907 routes the user's room address to an address on the video/audio switcher modulator 8906, as well as an associated address in the ADCSTRS 8903 to link the user's room to the gaming table 8506 through the GMS 8913.

In a preferred embodiment, in order to get the highest quality video possible up to the rooms, a video capture card will be incorporated in the GMS 8913. The capture board may accept the camera input, allow real time video overlay of the captured stream, and output the resulting composite video display as NTSC. An ATI Radeon board or other suitable board may handle the in/out functions and allow the video to be inserted into a Visual BASIC or other suitable graphic shell. A Coreco Bandit II or other suitable system may be used to perform video overlay and may also provide video output. It is understood that, although the ATI and Coreco boards are disclosed herein, any suitable processor or combination of processors may be used to perform these functions.

For blackjack, the graphics package on the GMS will preferably confirm all players' cards with graphic card representations, as well as provide graphic "bet entry buttons," chips, win/loss displays, etc. These graphics may "live" in a Visual BASIC or other suitable shell wrapped around the camera video feed. Ideally, the GMSs 8913 may be configured with a motherboard with an onboard video input/output card with 64 megabytes of video RAM (shared or otherwise), 128 megabytes of SDRAM, a 20 megabyte hard drive, an onboard LAN, a serial port, a USB port, and at least a Pentium III 800 MHz processor; however, any suitable components may be used.

The ADCSTRS 8903 may link a user's room number to a gaming table seat address to allow user control signals from the TV remote control to place bets, request cards, split, double down, and communicate any other blackjack-related game actions to the dealer. It may also acquire card denomination data from the card-reading shoe and process all resultant data to and from the user's control signals, the shoe, and the game table, through to the SQL or other suitable database server, and any table mounted bet displays.

The software in the ADCSTRS 8903 is preferably a multi-table, multi-seat, multi-user routing package that allows simultaneous two-way data, and simultaneous one-way video and audio transfer between multiple remote display/control signal input sources, a GMS 8913, a central server, and a back office SQL or other suitable database server 8904. The software package may control the switching of the common gaming table video and audio to all players, as well as transmit player specific card image triggers, account data, and bet inputs to the GMS 8913.

The ADCSTRS 8903 may interface to the network traffic manager 8907 through a serial RS-232 connection or any other suitable connection. The ADCSTRS software may be configured with a series of gaming table seat "code modules." Each of these blocks of code may handle all the required operational elements for one player at an in-room gaming table seat and the GMS 8913. Many code modules may run simultaneously on one ADCSTRS 8903 since the bulk of the bandwidth needed for each gaming table seat video output may be handled by the video/audio switcher modulator 8906.

The TV remote control command signals, as well as the user's financial data, bets, and win/loss activity, may be processed in, or through, the ADCSTRS 8903. The account-related signals may be sent either through the network traffic manager 8907 to an in-room folio account management server 8912, and/or sent on to an account management SQL or other suitable database server.

In system 8116, the TV remote control signals may be passed along through the ADCSTRS 8903 to the GMS 8913 through a serial port. The TV remote control signals may be converted to serial commands in the GMS 8913, and used to place bets, communicate card choices, etc. Additional serial communication between the GMS 8913 and the ADCSTRS 8903 may handle insertion of funds, player tracking, and the adding or removal of win/loss funds from the player's account. The buttons on the TV remote control 8910 may provide all the necessary triggers for the game play functions. More complex crediting and functionality may be achieved through the activation of a second layer of number commands.

The code resident on the ADCSTRS 8903 may populate the user account database. Whenever a file is changed or added to the software in any of the gaming products, the system 8116 preferably automatically updates all online system component software. In the case of a remote user logging on to the system with a client-based piece of hardware such as a thin client or set top box, the version control server may automatically uninstall the old version elements, if necessary, and update the software or firmware on that piece of hardware. The version control server preferably operates as follows:

a) Update its version number every time a file is changed;

b) Tag each changed file and associate the new files to its new version number;

c) Check a user's client version number at logon, looks up the current number and location of all updated files in the current server version number relative to the user's client version number, and updates the appropriate files on the user's client on his hard drive;

d) Automatically uninstall the old version prior to installing a full install package; and e) In the case of system file updates, the update server must check all system software in each module at startup and update files as necessary.

It is understood that although a card game is used to describe the features of this embodiment, the features of this embodiment may be used with any other type of electronic, electromechanical, or "live" game. It is to be further understood that the features of this embodiment may be employed in conjunction with the elements described above and below.

Figure 9:
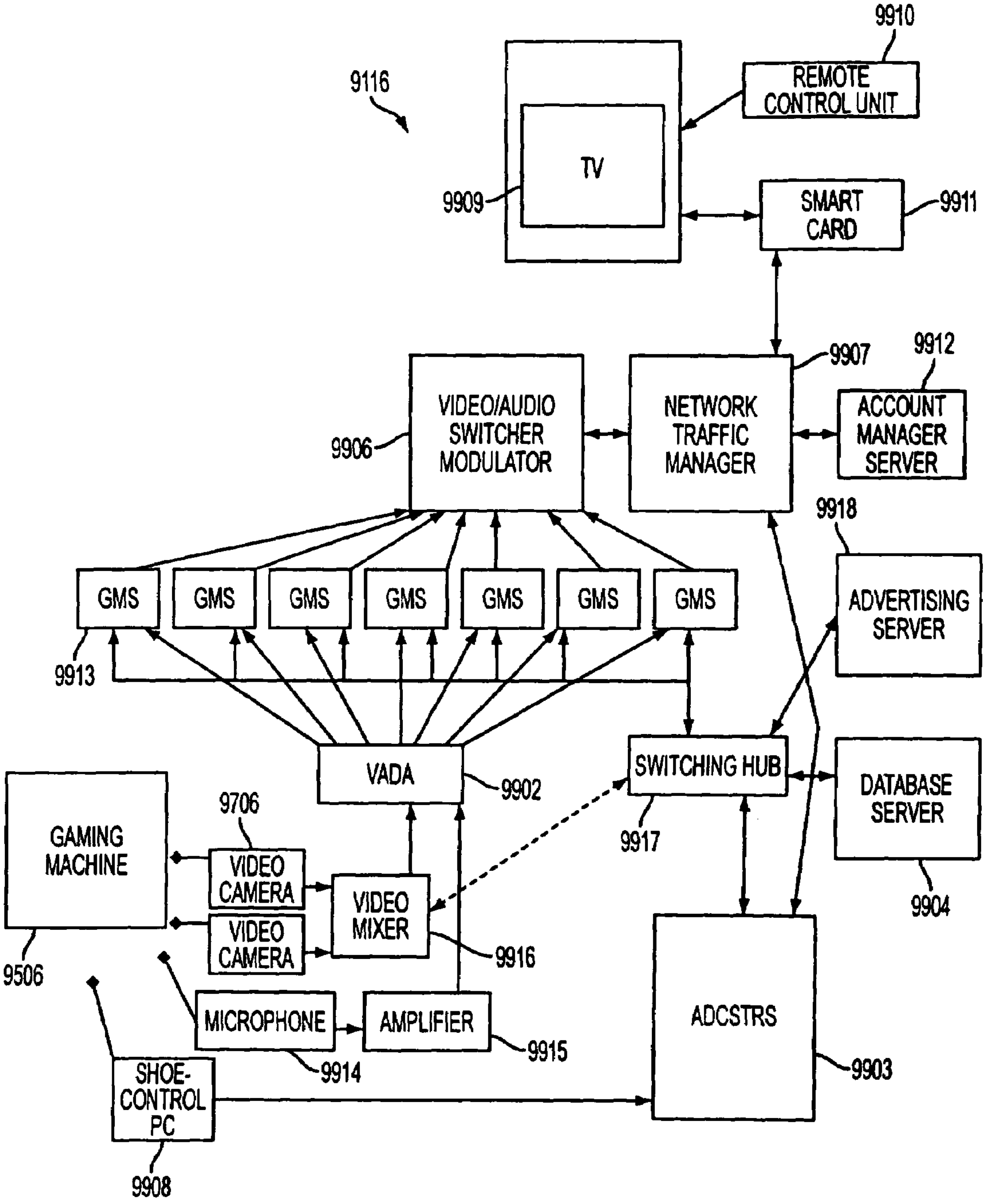
FIG. 9 is a schematic block diagram illustrating an additional example of a system for remotely participating in a game, wherein multiple game seat servers may be used with a video/audio distribution amplifier, according to principles of the invention.

FIG. 9 illustrates a further embodiment of a system 9116 having two cameras 9706 (preferably NTSC cameras or any other suitable camera) pointed at card or other gaming machine 9506, a card-reading shoe (not shown) and associated control PC 9908, a video mixer 9916 (PC or standalone), a VADA 9902, a microphone 9914/amplifier 9915 combination, multiple GMSs 9913 that are capable of sending different visual data to all players "seated" at the table from their in-room TV 9909, an ADCSTRS 9903, an SQL or other suitable back office accounting database server PC 9904, an advertising server PC 9918, a switching hub 9917, and the existing network traffic manager rack 9907. Of course, any suitable number of cameras may be used.

The primary additional features available in the system 9116 with multiple GMSs 9913 are graphic related. For a card game, the graphics package on each GMS 9913 will preferably show each player his or her down card, without showing it to the other players, and visually confirm the up card. In a preferred embodiment, each player's account balance may be overlaid on his or her in-room video display without showing this balance to the other players. Additional features may also be present in the GMSs 9913.

The system 9116 will preferably operate and interface to the in-room configurations as follows. Two high-resolution NTSC or other suitable format video cameras 9706 with wide enough aspect ratios to clearly show an entire gaming machine 9506, the dealer, and the card denominations, will preferably capture video images from the gaming machine, when it is, for example, a blackjack table. One camera 9706 may be aimed downward at the blackjack table from a position above the gaming machine 9506, for example, five feet. The other camera 9706 may be aimed at the dealer from a position several feet away from the center seat outer edge of the gaming machine 9506 at the dealer's eye level.

The camera signals may be mixed together in a video mixer 9916 to put the dealer's upper body in a logical relation to the table image. Two images may be used to optimize the clarity of the cards and the dealer's face. The video mixer 9916 will preferably be a Pentium III 800 MHz PC server with 256 megabytes of RAM with two Osprey 100 (or equivalent) capture cards installed, or it may be a SIMA SFX-M Pro Series (or equivalent) video mixer. The use of any suitable video mixing equipment is contemplated by the invention. The mixed camera video signal may be sent to VADA 9902.

A microphone 9914/amplifier 9915 combination may be used to capture audio signals from the gaming machine 9506. The microphone 9914 may be used to pick up the dealer's voice. The output of the microphone may be sent to the amplifier 9915 first, and then the amplifier 9916 output may be sent to the VADA 9902. The VADA 9902 will preferably distribute the video and audio signals in multiple streams to the GMSs. The GMSs may provide camera video and dealer audio, mixed with bet information text, additional graphics, and advertising media, to the video/audio switcher modulator.

A Mikohn or other suitable card-reading shoe may provide the card data needed to audit the cards that are dealt. The output from the card-reading shoe will preferably be integrated into a DOS-based or other suitable format shoe control PC 9908 and received as text data over an RS-232 or other suitable connection medium. The data may contain card denomination, suit information, player position, and bet amount. The shoe-control PC 9908 may, in turn, be interfaced to the ADCSTRS 9903 through a serial cable. The shoe-control PC may expect to see a bet amount from table position chip readers. In a preferred configuration, the chip position data will preferably be emulated in the ADCSTRS 9903 to provide a placeholder for each user to enable the shoe data output. In an alternate implementation, the RS-232 shoe data may be sent directly to the ADCSTRS 9903, bypassing the shoe-control PC 9908. The data display from the shoe may be in a DOS text format or in a custom protocol which triggers a GIF-based card image library overlaid, or displayed, on the user's in-room TV 9909 or computer display.

"Bet displays" may be located at the table to give player choice cues to the dealer. These cues may consist of either a small red LED display, for example, 4 inches-by-6 inches, at each player seat or several large LCD display monitors mounted in the dealer's field of view.

A blackjack player in a hotel room will preferably enter command signals through the TV remote control unit buttons 9910 into the smart card 9911 mounted in the TV 9909. These signals may be sent from the smart card through the TV's RJ-59/U cable to the network traffic manager 9907. The network traffic manager 9907 may identify the room address. The buttons on the TV remote control 9910 may be used to select menus on the in-room TV 9909 that link the player to a series of gaming machine 9506 choices. Although these may be presented in the same or a similar manner as presenting movie selections for in-room viewing, any suitable manner of presentation is contemplated by the invention.

There may be menus and graphics for the system 9116 to direct users to the appropriate gaming machines 9506, allow users to check balances, and return to the main menu and regular TV 9909. The menus and graphics are preferably created in 640×480 resolution and installed on the network traffic manager 9907. The menu path may be configured for a blackjack game as follows. A user logs on and goes to a blackjack table menu, which is found as an available choice on the main menu. The user may then choose a seat at a blackjack table, and this choice may then be sent directly to an available seat. Additional choices may be provided including numerical links to other menus, lobby, account balances, etc.

For a card game, when a specific seat at a gaming machine 9506 is chosen, the network traffic manager may route the user's room address to an address on the video/audio switcher modulator 9906, as well as an associated address in the ADCSTRS to link the user's room to the gaming machine 9506 through a GMS 9913. A video capture card may be incorporated in the GMSs 9913 in order to get the highest quality video possible up to the rooms. The capture boards may accept the camera feeds that are split and distributed by the VADA, allow real time video overlay of the captured stream, and output the resulting composite video display as NTSC.

Preferably, there will be space inside each GMS to use a graphics card, such as an ATI Radeon card or any suitable card, for the video in/out. Any suitable computer, such an 800 MHz to 1 GHz Pentium III with 256 megabytes of RAM, and 20 megabyte hard drive, an onboard LAN, a serial port, and a USB port, may be used to run a Media Player window or other suitable window simultaneously with the NTSC or other suitable format display. Preferably, the GMSs 9913 will be configured with a motherboard with onboard video output capability.

The graphics packages on the GMSs 9913 may individually confirm each players' up and down cards with graphic card representations, as well as provide graphic "bet entry buttons," chips, win/loss displays, etc. These graphics may "live" in a Visual BASIC or other suitable shell wrapped around the camera video feed.

The GMSs may be associated with room numbers by the network and in-room servers. The GMSs may also provide text overlays, account information and may also include video streaming software, for example, Real Player or Windows Media or any suitable alternative, to allow playback of customer specific advertising/info that is fed through the ADCSTRS 9903 from the advertising server 9918. The advertising server 9918 will preferably plug into the system 9116 at the switching hub. The advertising server 9918 may store video and audio advertising media that may be sent to any or all users simultaneously or independently. Player tracking data may be used to optimize advertising to a particular player's likes and needs.

A switching hub may link the ADCSTRS 9903 to all outboard servers, SQL or other suitable database server, advertising server, GMS, and video server and the in-room system through RJ-45 network cables. The ADCSTRS 9903 may also connect the in-room system through a serial RS-232 link.

The ADCSTRS 9903 may link a user's room number to a GMS address, allow user control signals from the TV remote control 9910 to place bets, request cards, split, double down, and communicate any other blackjack-related game actions to the dealer. It also may acquire card denomination data from the card-reading shoe, and process all resultant data to and from the user's control signals, the shoe, and the game table, through to the SQL or other suitable database server, and any table mounted bet displays.

The software for the ADCSTRS 9903 will preferably be a multi-table, multi-seat, multi-user routing package that allows simultaneous two-way data, and simultaneous one-way video and audio transfer between multiple remote display/control signal input sources, a GMS, a central server, and a back office SQL or other suitable database server 9904. The software package will preferably control the switching of the common blackjack table video and audio to all players, as well as transmit player specific card image triggers, account data, and bet inputs to the GMS 9913.

The ADCSTRS 9903 may interface to the network traffic manager through a serial RS-232 or other suitable connection. For blackjack, the ADCSTRS software may be configured with a multitude of blackjack table seat "code modules." Each of these blocks of code will preferably handle all the required operational elements for one blackjack table seat and its associated GMS 9913. Many code modules may run simultaneously on one ADCSTRS 9903 since the bulk of the bandwidth needed for each blackjack table seat video output may be handled by the video/audio switcher modulator 9906.

The TV remote control 9910 may command signals, as well as the user's financial data, bets, and win/loss activity, are processed in, or through, the ADCSTRS 9903. The account-related signals may either be sent through the network traffic manager 9907 to an in-room folio database 9912, and/or sent on to an account management database server.

In system 9116, the TV remote control signals may be passed along through the ADCSTRS 9903 to the GMS 9913 through a network hub. The TV remote control signals may be converted to serial commands in the GMSs 9913, and used to place bets, communicate card choices, etc. Additional data communication between the GMS 9913 and the ADCSTRS 9903 will preferably handle insertion of funds, player tracking, and the adding or removal of win/loss funds from the player's account.

The buttons on the TV remote control 9910 may provide all the necessary triggers for the blackjack game play functions. More complex crediting and functionality may be achieved through the activation of a second layer of number commands.

The code resident on the ADCSTRS 9903 may populate the user account database. Whenever a file is changed or added to the software in any of the gaming products, the system preferably automatically updates all online system component software. In the case of a remote user logging on to the system with a client-based piece of hardware such as a thin client or set top box, the version control server may automatically uninstall the old version elements, if necessary, and update the software or firmware on that piece of hardware. The version control server may operate as follows:

a) Update its version number every time a file is changed;

b) Tag each changed file and associate the new files to its new version number;

c) Check a user's client version number at logon, looks up the current number and location of all updated files in the current server version number relative to the user's client version number, and updates the appropriate files on the user's client hard drive;

d) Automatically uninstall the old version prior to installing a full install package; and e) In the case of system file updates, the update server must check all system software in each module at startup and update files as necessary.

It is understood that although a card game is used to describe the features of this embodiment, the features of this embodiment may be used with any other type of electronic, electromechanical, or "live" game. It is further understood that the features of this embodiment may be employed in conjunction with the elements described above and below.

Figure 10:
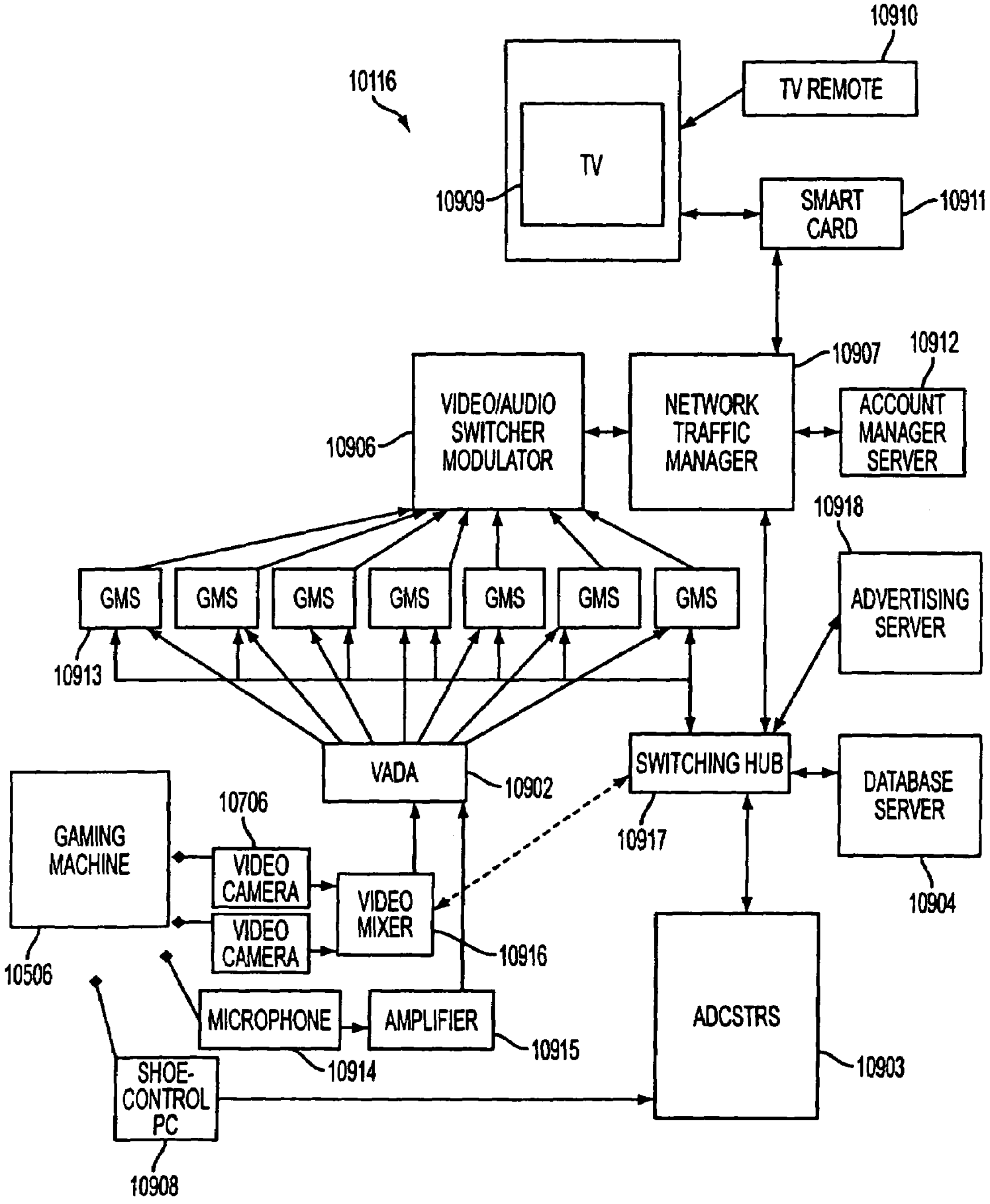
FIG. 10 is a schematic block diagram illustrating still another example of a system for remotely participating in a game, wherein video server array may be used to store video, according to principles of the invention.

FIG. 10 illustrates an embodiment of a system 10116. The configurations for the system 10116 have certain features in common with the systems illustrated in FIGS. 6-9 and described above. In a preferred embodiment, system 10116 has a redesigned protocol translation software located in the ADCSTRS 10903 and the GMSs 10913 to make use of the increased control options made available from the in-room keyboard/mouse, as handed off by the ADCSTRS 10903.

The system 10116 preferably uses a video server array that stores movies in MPEG-2 or any other suitable format and decodes to NTSC prior to shipping the signal through the video/audio switcher modulator 10906 and through the RJ-59/U cable to the in-room TV 10909.

Preferably, the system 10116 uses an IS client configured with a 400 MHz Celeron processor, 64 megabytes of memory, a 10 gigabyte hard drive, and a PCI-based VGA card running at 640×480 full color mode with a TV output and an Ethernet connection. These devices may be used to provide in-room Web access. It is understood that any suitable component or components may be utilized to perform these functions.

For blackjack, players may use the in-room TV remote 10910 or keyboard/mouse to control the client and transmit the client video output to the room as NTSC or other suitable format video data through the video/audio switcher modulator. Preferably, the interface will be designed to route the keyboard/mouse commands directly to the GMSs 10913, and process commands.

It is understood that although a card game is used to describe the features of this embodiment, the features of this embodiment may be used with any other type of electronic, electromechanical, or "live" game. It is further understood that the features of this embodiment may be employed in conjunction with the elements described above and below.

Figure 11:
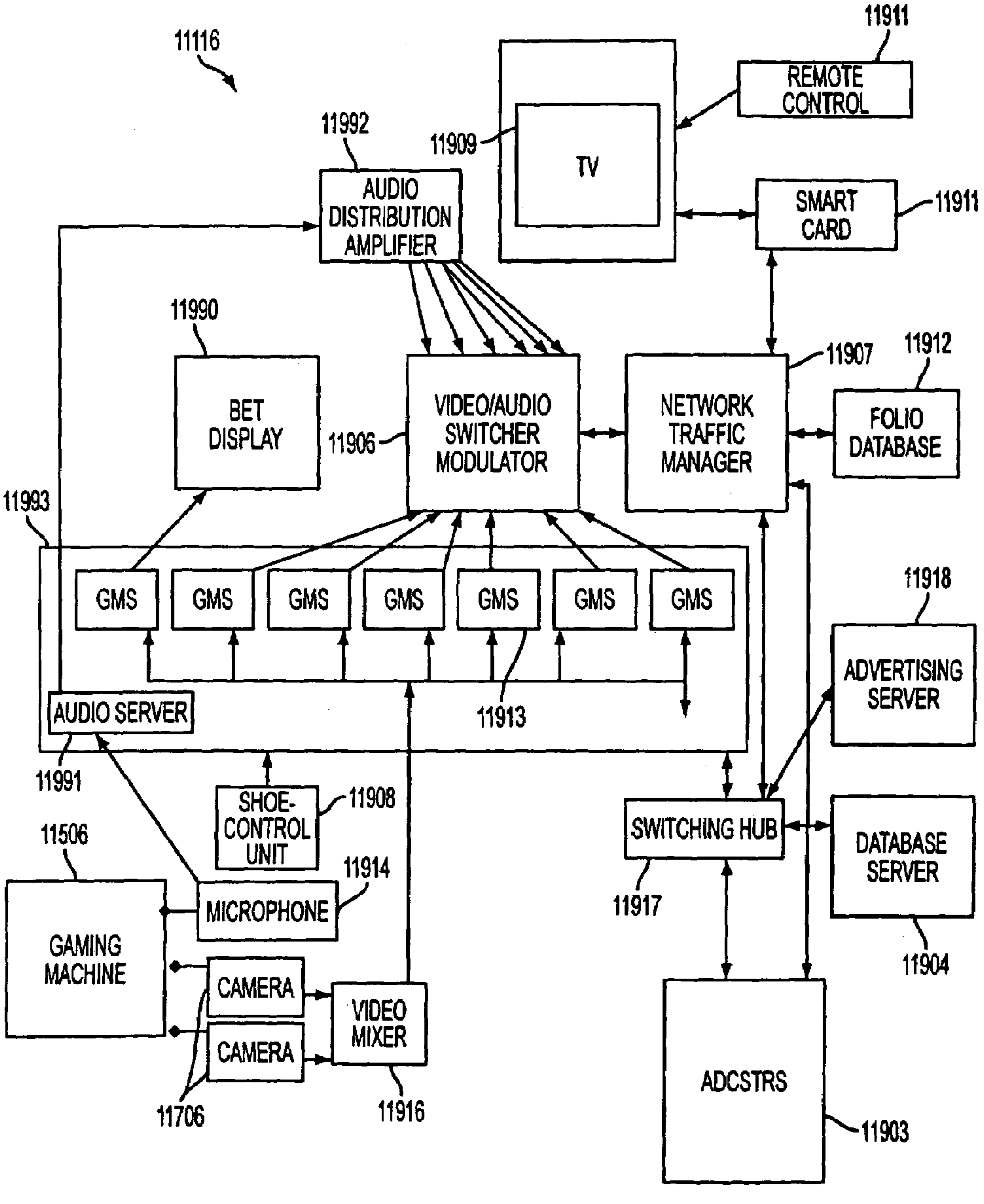
FIG. 11 is a schematic block diagram illustrating yet another example of a system for remotely participating in a game, wherein an alternative video server configuration may be used to store, create, and distribute video, according to principles of the invention.

FIG. 11 illustrates an embodiment of a system 11116. The configurations for the system 11116 have certain features in common with the systems illustrated in FIGS. 6-10 and described above. In a preferred embodiment, system 11116 is that the function of several GMSs 11913 may be combined into a single server 11993. Other features of this system may include an audio distribution amplifier 11992, an ADCSTRS 11903, a database 11904, a switching hub 11917, a microphone 11914, a shoe control unit 11908, one or more cameras 11706, a gaming machine 11506, a television or other suitable display device 11909, a remote control 11911, a smart card 11911, a network traffic manager 11907, a video/audio switcher modulator 11906, a bet display 11990, an audio server 11991, a folio database 11912, a video mixer 11916 and any other suitable components.

It is understood that the features of this embodiment may be used with a card game such as blackjack or any other type of electronic, electromechanical, or "live" game. It is further understood that the features of this embodiment may be employed in conjunction with the elements described above. In addition, it is understood that any number of certain elements disclosed in the various embodiments may be used, such as one or more cameras.

It is to be understood that the embodiments and variations shown and described herein are merely illustrative of the principles of the invention and that various modifications may be implemented by those skilled in the art without departing from the scope and spirit of the invention. It is to be further understood that the scope of the invention presented herein contemplates any combination of elements from the various embodiments disclosed herein.

What is claimed is:

1. A system by which a player may remotely play a physical slot machine gaming device that is among a plurality of physical slot machine gaming devices each of which was previously approved by a gaming regulator for the locale in which the device is located, wherein said player has access to a video display in communication with a data network, the system comprising:

- a video camera in communication with said data network and configured to provide visual data concerning said physical slot machine gaming device to said player via said video display; and
- a server in communication with the plurality of physical slot machine gaming devices, wherein the server comprises:
  - a polling function that polls for the plurality of physical slot machine gaming devices for a play availability for each physical slot machine gaming device;
  - a display function that creates data for display of the play availability of each of the plurality of physical slot machine gaming devices; and
  - a lock function that prevents others from playing the physical slot machine gaming device once it has been selected for play by the player.

2. The system of claim 1, wherein said video display comprises a television.

3. The system of claim 1, wherein said video display comprises a laptop computer.

4. The system of claim 1, wherein said physical slot machine gaming device comprises a standalone device.

5. The system of claim 1, wherein said physical slot machine gaming device comprises an electrical gaming device.

6. The system of claim 1, wherein said physical slot machine gaming device comprises a mechanical gaming device.

7. The system of claim 1, wherein said visual data concerning said physical slot machine gaming device is transmitted to a hotel guest room via an in-room video distribution system.

8. The system of claim 1, wherein said visual data concerning said physical slot machine gaming device is transmitted to a hotel guest room via an Internet.

9. The system of claim 1, wherein said visual data concerning said physical slot machine gaming device is transmitted to a hotel guest room via a LAN.

10. The system of claim 1, wherein said visual data concerning said is transmitted to a hotel guest room via a WAN.

11. The system of claim 1, wherein said visual data concerning said physical slot machine gaming device is transmitted to a hotel guest room via a dialup connection.

12. The system of claim 1, wherein said visual data concerning said physical slot machine gaming device is transmitted to a hotel guest room via any combination of two or more items selected from the group consisting of an Internet, a LAN, a WAN, and a dialup connection.

13. The system of claim 1, wherein one or more features of a remote control device are used to select a menu on said video display to enable said player to make one or more game choices.

14. The system of claim 13, wherein said game choices comprise a particular physical slot machine gaming device.

15. The system of claim 13, wherein said game choices comprise allowing the player to check an account balance.

16. The system of claim 13, wherein said game choices comprise returning to a menu for said video display.

17. The system of claim 13, wherein said game choices comprise communicating game-related actions.

18. The system of claim 17, wherein said game-related actions comprise placing a bet.

19. The system of claim 13, wherein said features of said remote control device provide all necessary triggers for game play functions.

20. The system of claim 1, wherein the plurality of physical slot machine gaming devices are networked together to provide for progressive jackpots.

21. A method by which a player may remotely play a physical slot machine gaming device that is among a plurality of physical slot machine gaming devices each of which was previously approved by a gaming regulator for the locale in which the device is located, wherein said player has access to a video display in communication with a data network, said method comprising:

- providing visual data concerning said physical slot machine gaming device to said player via said video display;
- polling the plurality of physical slot machine gaming devices for a play availability for each physical gaming device;
- providing data for displaying the play availability of each of the plurality of physical slot machine gaming devices; and
- preventing others from playing the physical slot machine gaming device once it has been selected for play by the player.

22. The method of claim 21, wherein said video display comprises a television.

23. The method of claim 21, wherein said video display comprises a laptop computer.

24. The method of claim 21, wherein said physical slot machine gaming device comprises a standalone device.

25. The method of claim 21, wherein said physical slot machine gaming device comprises an electrical gaming device.

26. The method of claim 21, wherein said physical slot machine gaming device comprises a mechanical gaming device.

27. The method of claim 21, wherein said visual data concerning said physical slot machine gaming device is transmitted to a hotel guest room via an in-room video distribution system.

28. The method of claim 21, wherein said visual data concerning said physical slot machine gaming device is transmitted to a hotel guest room via an Internet.

29. The method of claim 21, wherein said visual data concerning said physical slot machine gaming device is transmitted to a hotel guest room via a LAN.

30. The method of claim 21, wherein said visual data concerning said physical slot machine gaming device is transmitted to a hotel guest room via a WAN.

31. The method of claim 21, wherein said visual data concerning said physical slot machine gaming device is transmitted to a hotel guest room via a dialup connection.

32. The method of claim 21, wherein said visual data concerning said physical slot machine gaming device is transmitted to a hotel guest room via any combination of two or more items selected from the group consisting of an Internet, a LAN, a WAN, and a dialup connection.

33. The method of claim 21, wherein one or more features of remote control device are used to select a menu on said video display to enable said player to make one or more game choices.

34. The method of claim 33, wherein said game choices comprise a physical slot machine gaming device.

35. The method of claim 33, wherein said game choices comprise a seat at a gaming machine.

36. The method of claim 33, wherein said game choices comprise a seat at a game table.

37. The method of claim 33, wherein said game choices comprise allowing the player to check an account balance.

38. The method of claim 33, wherein said game choices comprise returning to a menu for said video display.

39. The method of claim 33, wherein said game choices comprise communicating game-related actions.

40. The method of claim 39, wherein said game-related actions comprise placing a bet.

41. The method of claim 33, wherein said features of said remote control device provide all necessary triggers for game play functions.

42. The method of claim 21, wherein the plurality of physical slot machine gaming devices are networked together to provide for progressive jackpots.

43. A system by which a player may remotely play a physical slot machine gaming device that is among a plurality of physical slot machine gaming devices each of which was previously approved by a gaming regulator for the locale in which the device is located, said system comprising:

means for providing visual data concerning said physical slot machine gaming device to said player via a video display;

a data network in communication with said means for providing visual data;

means for polling the plurality of physical slot machine gaming devices for a play availability for each physical slot machine gaming device;

means for providing data for displaying the play availability of each of the plurality of physical slot machine gaming devices, said means for providing data for displaying in communication with said data network; and means for preventing others from playing the physical slot machine gaming device once it has been selected for play by the player.

44. The system of claim 43, wherein the plurality of physical slot machine gaming devices are networked together to provide for progressive jackpots.

* * * * *